United States Patent
Shimomura et al.

(10) Patent No.: US 7,720,775 B2
(45) Date of Patent: *May 18, 2010

(54) LEARNING EQUIPMENT AND LEARNING METHOD, AND ROBOT APPARATUS

(75) Inventors: Hideki Shimomura, Kanagawa (JP); Kazumi Aoyama, Saitama (JP); Keiichi Yamada, Tokyo (JP); Yasuharu Asano, Kanagawa (JP); Atsushi Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 10/476,662

(22) PCT Filed: Mar. 5, 2003

(86) PCT No.: PCT/JP03/02560

§ 371 (c)(1),
(2), (4) Date: Nov. 4, 2003

(87) PCT Pub. No.: WO03/075261

PCT Pub. Date: Sep. 12, 2003

(65) Prior Publication Data

US 2005/0004710 A1  Jan. 6, 2005

(30) Foreign Application Priority Data

Mar. 6, 2002  (JP)  ............... 2002-060425

(51) Int. Cl.
*G06N 5/00* (2006.01)

(52) U.S. Cl. ........................ 706/45; 700/245

(58) Field of Classification Search ............ 706/45; 700/245

See application file for complete search history.

(56) References Cited

U.S. PATENT DOCUMENTS 6,118,888 A * 9/2000 Chino et al. ............ 382/118

(Continued)

FOREIGN PATENT DOCUMENTS

JP  09-363122  * 12/1997

(Continued)

OTHER PUBLICATIONS

"Learning Audio-Visual Associations using Mutual Information". International Conference on Computer Vision, Workshop on Integrating Speech and Image Understanding. Corfu, Greece. Deb Roy, Bernt Schiele, and Alex Pentland. (1999).*

(Continued)

*Primary Examiner*—David R Vincent
*Assistant Examiner*—Mai T Tran
(74) *Attorney, Agent, or Firm*—Frommer Lawrence & Haug LLP; William S. Frommer; Thomas F. Presson

(57) ABSTRACT

Conventional robot apparatus etc. can not perform name-learning naturally. Learning the name of an object is performed such a manner that the name of a target object is obtained through dialog with a human being, the name is stored in association with plural items of different characteristic data detected for the target object, and a new object is recognized based on the stored data and associative information, the name and characteristic data of the new person are obtained and this associative information is stored.

15 Claims, 19 Drawing Sheets

U.S. PATENT DOCUMENTS 6,516,247 B2 * 2/2003 Funada .................. 700/245
6,799,086 B2 * 9/2004 Toki ...................... 700/245

FOREIGN PATENT DOCUMENTS

WO         WO 0043168     *   7/2000

OTHER PUBLICATIONS

"Multilevel Integration of Vision and Speech Understanding Using Bayesian Networks", S. Wachsmuth, H. Brandt-Pook, G. Socher, F. Kummert, and G. Sagerer. In H. I. Christensen, editor, Computer Vision Systems: First Int. Conf., vol. 1542 of Lecture Notes in Computer Science, pp. 231-254. Springer-Verlag, 1999.*

"AIBO's first words: The social learning of language and meaning", Steels, L. And Kaplan, F. Evolution of Communication, 4(1): 3-32 2000.*

"Human-robot interface based on the mutual assistance between speech and vision", M. Yoshizaki, Y. Kuno, A. Nakamura, ACM International Conference Proceeding Series; vol. 15, 2001, pp. 1-4.*

"A Multimodal System for Object Learning", Frank Lömker, Gerhard Sagerer, Applied Computer Science, DAGM 2002, LNCS 2449, pp. 490-497.*

"AIBO's first words: The social learning of language and meaning", Steels Luc, Kaplan Frederic, Evolution of communication, ISSN 1387-5337, vol. 4, No. 1, pp. 1-35, 2000.*

Deb Roy, "Integration of speech and vision using mutual information", Proceedings of the 2000 IEEE International Conference on Acoustics, Speech, and Signal Processing, May 6, 2000, vol. 4, pp. 2369-2372.

Kyeong Jun Kim et al., "The algorithms for the acquisition of linguistic speech units based on integrating perceptual information", The Institute of Electronics, Information and Communication Engineers, Oct. 13, 2000, TL2000-2001, pp. 9-16.

Hideki Shimomum et al. "Autonomous Entertainment Robot and Speech Dialogue" Digital Creatures Laboratory, Sony Corporation, Nov. 7, 2002, pp. 21-26.

Fei Huang et al: "Dialogue Management for Multimodal User Registration" Proceedings of the International Conference on Spoken Language Processing, Oct. 16, 2000, XP007010805 Beijing, China. chapters 3. 1-3.4.

Duc B et al: "Fusion of audio and video information for multi modal person authentication" Pattern Recognition Letters, North-Holland Publ. Amsterdam, NL, vol. 18, No. 9, Sep. 1997, pp. 835-843, XP004102224 ISSN: 0167-8655. chapters 1,4,5.

Neti C et al: "Perceptual Interfaces for Information Interaction: Joint Processing of Audio and Visual Information for Human-Computer Interaction" Proceedings of the International Conference on Spoken Language Processing, Oct. 16, 2000, pp. 11-14, XP007010775 Beijing, China. chapters 1-4.

* cited by examiner

| FID | SID | NAME |
|---|---|---|
| 1 | 2 | FUJITA |
| 2 | 5 | YOSHIDA |

FIG. 7

| FID | SID | NAME |
|---|---|---|
| 1 | 2 | FUJITA |
| 2 | 5 | YOSHIDA |
| 4 | 6 | YAMAMOTO |

FIG. 12

```
R:YOU ARE FUJITA-SAN, AREN'T YOU?
H:YES, I AM.
R:IT'S FINE TODAY, ISN'T IT?
H:YES, IT REALLY IS.
             .
             .
             .
             .
```

FIG. 10

```
(R:UH, YOU ARE FUJITA-SAN, AREN'T YOU?)
(H:NO, I AM NOT.                        )
 R:OH! MAY I HAVE YOUR NAME, PLEASE?
 H:I AM YAMAMOTO.
 R:I AM ROBOT. NICE TO MEET YOU.
 H:NICE TO MEET YOU, TOO.
 R:YAMAMOTO-SAN, IT'S FINE TODAY, ISN'T IT?
 H:YES, IT REALLY IS.
```

FIG. 11

```
R:UH, YOU ARE FUJITA-SAN, AREN'T YOU?
H:NO, I AM NOT.
R:OH! MAY I HAVE YOUR NAME, PLEASE?
H:I AM YOSHIDA.
R:YES, YOU ARE YOSHIDA-SAN. NOW, I REMEMBER YOU.
  IT'S FINE TODAY, ISN'T IT?
H:YES, IT REALLY IS.
R:UH, WHEN DID WE MEET LAST TIME?
H:WELL, I THINK WE MET THE DAY BEFORE YESTERDAY.
```

FIG. 13

```
R:UH, YOU ARE FUJITA-SAN, AREN'T YOU?
H:NO, I AM NOT.
R:OOPS! MAY I HAVE YOUR NAME, PLEASE?
H:I AM YAMAMOTO.
R:OH YES, YOU ARE YAMAMOTO-SAN. HOW HAVE YOU BEEN?
H:I'VE BEEN FINE.
```

FIG. 14

| ENTRY | | PHONEME SERIES |
|---|---|---|
| boku | [僕] | boku |
| chigau | [違う] | chigau |
| doko | [どこ] | doko |
| genki | [元気] | geNki |
| iro | [色] | iro |
| janai | [じゃない] | janai |
| kirai | [嫌い] | kirai |
| kudasai | [ください] | kudasai |

FIG. 16

```
$col     = [kono | sono] iro wa;
$this    = kore [(ga | wa | mo)];
$neg     = (Chagau | iie) [$sil];
$null    = $sil;
$des     = (desu | da) [yo] | yo;
$not     = janai [yo];
$color1  = $null | $neg | [$neg] $col | [$neg] $this;
$color2  = [iro] (desu | janai | da) [yo];
$pat1    = $color $garbage $color2;
```

FIG. 17

| ID | PHONEME SERIES | CHARACTERISTIC VECTOR SERIES |
|---|---|---|
| 1 | --- | --- |
| 2 | --- | --- |
| ⋮ | ⋮ | ⋮ |
| N | --- | --- |
| N+1 | --- | --- |

FIG. 18

| PHONEME SERIES | SPEECH WORDS |
|---|---|
| doroa: | FURO (BATH) × 1; |
| kuro | FURO × 3; |
| Nfuro | FURO × 20; |
| NhoNn | HON (BOOK) × 18; |
| hoNN | HON × 6; |
| NhoNda | HON × 10; |
| NhoNde:su | HON × 4; |
| ohoN | ORANGE × 1; HON × 19; |
| hoNgdawasoNre:a: | HON × 2; |
| a:modori: | GREEN COLOR × 11; |
| omidori: | GREEN COLOR × 10; |
| e:imidori: | GREEN COLOR × 3; |
| Nmidori: | GREEN COLOR × 5; |
| a:midori:iroiresu | GREEN COLOR × 4; |
| Nro:ka | ROKA (PASSAGE) × 10; |
| Nro:kaNa | ROKA × 10; |

FIG. 23

| ID | PHONEME SERIES | CLUSTER NOS | REPRESENTATIVE MEMBER ID | SCORE (DISTANCE) | | | | | | |
|---|---|---|---|---|---|---|---|---|---|---|
| | | | | 1 | 2 | 3 | ... | N | | N+1 |
| 1 | ... | 1 | 1 | s(1,1) | s(1,2) | s(1,3) | ... | s(1,N) | | s(1,N+1) |
| 2 | ... | 2 | 2 | s(2,1) | s(2,2) | s(2,3) | ... | s(2,N) | | s(2,N+2) |
| 3 | ... | 1 | 1 | s(3,1) | s(3,2) | s(3,3) | ... | s(3,N) | | s(3,N+3) |
| ... | ... | ... | ... | ... | ... | ... | ... | ... | | ... |
| N | ... | 1 | 1 | s(N,1) | s(N,2) | s(N,3) | ... | s(N,N) | | s(N,N+1) |
| N+1 | ... | 2 | 2 | s(N+1,1) | s(N+1,2) | s(N+1,3) | ... | s(N+1,N) | | s(N+1,N+1) |

FIG. 19

# LEARNING EQUIPMENT AND LEARNING METHOD, AND ROBOT APPARATUS

TECHNICAL FIELD

The present invention relates to learning equipment and learning methods, and robot apparatus, and is preferably applied to entertainment robots, for example.

BACKGROUND ART

A number of entertainment robots for home use have been developed in recent years for commercial purpose. Installed with various external sensors such as a CCD (Charge Coupled Device) camera and a microphone, some of those entertainment robots are designated to recognize exterior circumstances based on outputs of such external sensors and behave autonomously based on recognition results.

If such entertainment robots can remember the names of new objects (including human beings, hereinafter, too) in association with these objects, they can communicate with users more smoothly, and in addition, they may be able to flexibly react to a variety of commands regarding an object other than objects of which names are registered beforehand, for example, "Kick the ball" issued by the user. Note that remembering the name of an object in association with the same object as described above, is expressed as "to learn the name, and such a function is referred to as a "name-learning function" hereinafter.

Further, if an entertainment robot can learn the name of a new object via dialog with an ordinary person by providing such a name-learning function in the entertainment robot as human beings do, it may be the most desirable from the viewpoint of its naturalness and it is expected that the entertainment property of the entertainment robot may increase much more.

There is a problem with conventional techniques, however, that it is difficult to let an entertainment robot judge whether the name of a new object showing up in front of itself should be learned.

Because of this, in the conventional techniques, a user issues a clear voice command or presses a particular touch sensor to change an operation mode to a registration mode, in order to make an object recognized and make its name registered. When considering the natural interaction between the user and the entertainment robot, however, there has been a problem that the registration of a name in response to such a clear indication is quite unnatural.

DESCRIPTION OF THE INVENTION

This invention has been made in consideration of the above points, and is intended to propose learning equipment and learning methods, and robot apparatus that may markedly enhance the entertainment property.

In order to solve those problems, in the present invention, learning equipment comprises: a dialog means, having a capability of dialoging with a human being, for obtaining the name of a target object from the human being through the dialog; a plurality of recognition means for detecting prescribed different characteristics of the target object and for recognizing the target object based on the detection result and the data of the characteristics corresponding to known objects stored beforehand; a storage means for storing associative information wherein the name of a known object and recognition results on the object obtained by the recognition means are associated with each other; a judgment means for judging whether or not the target object is a new object, based on the name of the target object obtained by the dialog means, recognition results on the target object obtained by the recognition means, and the associative information stored in the storage means; and a control means for letting the recognition means store the corresponding data of the characteristics of the target object and letting the storage means store the associative information on the target object when the judgment means judges the target object to be a new object.

As a result, this learning equipment can learn the names of new persons, objects, etc. naturally through dialog with ordinary people as human beings usually do, without necessitating name registration in response to clear indications from users such as giving sound commands or pressing a touch sensor.

Also, in the present invention the learning method comprises: the first step of dialoging with a human being and obtaining the name of a target object from the human being through the dialog, and of detecting a plurality of prescribed different characteristics of the target object and recognizing the target object based on the detection result and the data of the characteristics of known objects stored beforehand; the third step of judging whether or not the target object is the new object, based on the name of the target object obtained, recognition results based on each of the characteristics of the target object, and the associative information relating the name of the known object stored beforehand with the recognition results on the object produced by the recognition means; and the fourth step of storing the data of each of the characteristics of the target object and the associative information on the target object when the target object is judged to be a new object.

As a result, according to this learning method, it is possible to learn the names of new persons, objects, etc. naturally through dialog with ordinary people as human beings usually do, without necessitating name registration in response to clear indications from users such as giving sound commands or pressing a touch sensor.

Furthermore, in the present invention a robot apparatus comprises: dialog means, having a capability of dialoging with a human being, for obtaining the name of a target object from the human being through the dialog; a plurality of recognition means for detecting prescribed different characteristics of the target object and for recognizing the target object based on the detection result and the data of the corresponding characteristics of known objects stored beforehand; storage means for storing associative information relating the name of the known object with recognition results on the object obtained by the recognition means; judgment means for judging whether or not the target object is the new object based on the name of the target object obtained by the dialog means, recognition results on the target object obtained by the recognition means, and the associative information stored in the storage means; and control means for letting the recognition means store the data of the corresponding characteristics of the target object and letting the storage means store the associative information on the target object when the judgment means judges the target object to be the new object.

As a result, this robot apparatus can learn the names of new persons, objects, etc. naturally through dialog with ordinary people as human beings usually do, without necessitating name registration in response to clear indications from users such as giving sound commands or pressing a touch sensor.

BRIEF DESCRIPTION OF THE DRAWINGS

FIG. 7 is a conceptual diagram used in explaining association of FID and SID with names in memory.

FIG. 10 is a schematic diagram showing an example of dialog in name-learning processing.

FIG. 11 is a schematic diagram showing an example of dialog in name-learning processing.

FIG. 12 is a conceptual diagram used in explaining new registration of FID and SID, and name.

FIG. 13 is a schematic diagram showing an example of dialog in name-learning.

FIG. 14 is a schematic diagram showing an example of dialog in name-learning processing.

FIG. 16 is a block diagram used in explaining a word dictionary.

FIG. 17 is a conceptual diagram used in explaining the grammatical regulations.

FIG. 18 is a conceptual diagram used in explaining the contents stored in the characteristic vector buffer.

FIG. 19 is a conceptual diagram used in explaining a scoresheet.

FIG. 23 is a conceptual diagram showing simulation results.

BEST MODE FOR CARRYING OUT THE INVENTION

Figure 1:
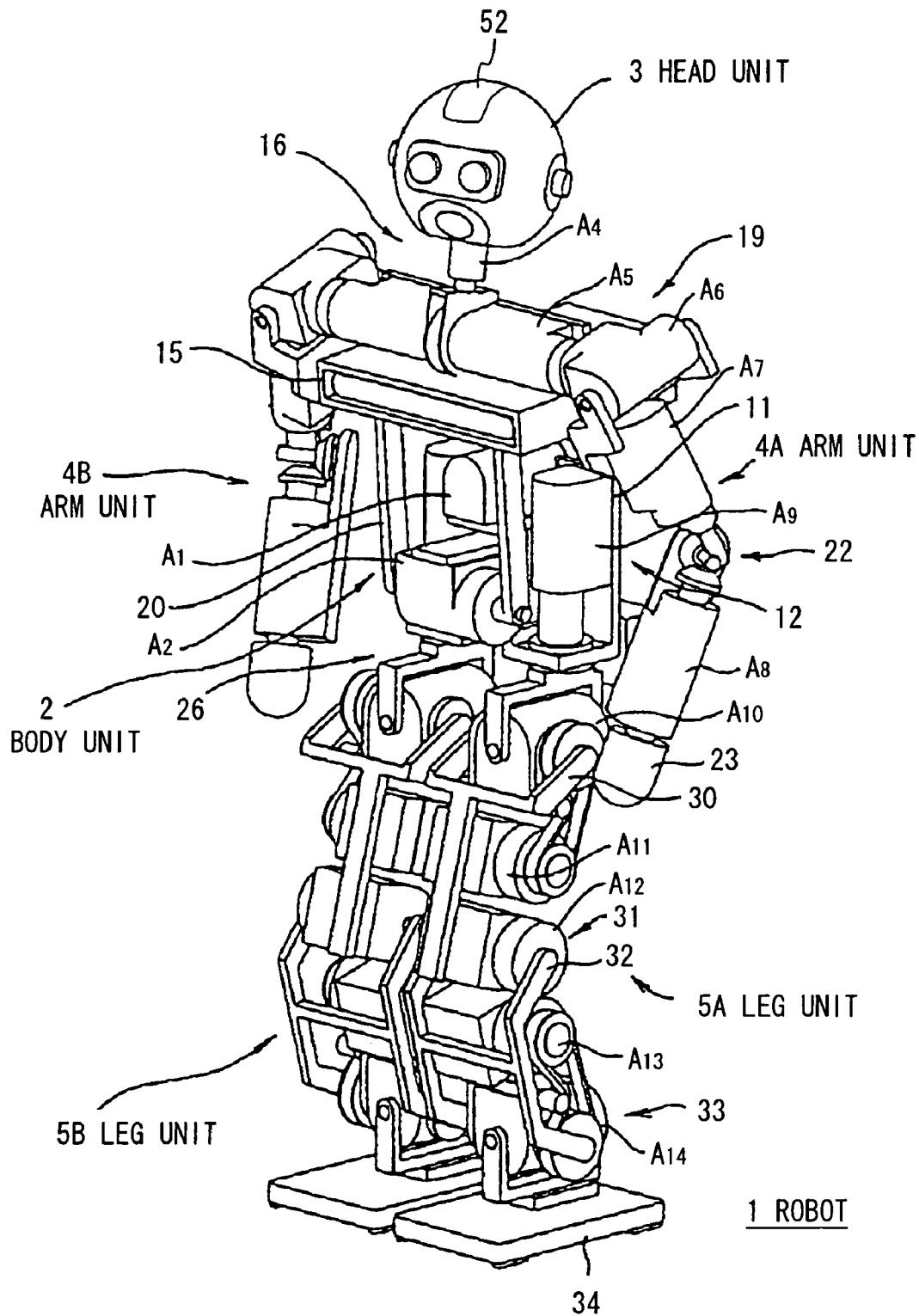
FIG. 1 is a perspective diagram showing the external construction of a robot in this embodiment.

Detailed description is given on one mode of carrying out the invention hereunder, referring to the drawings.

(1) Construction of a Robot in this Mode of Embodiment

Figure 2:
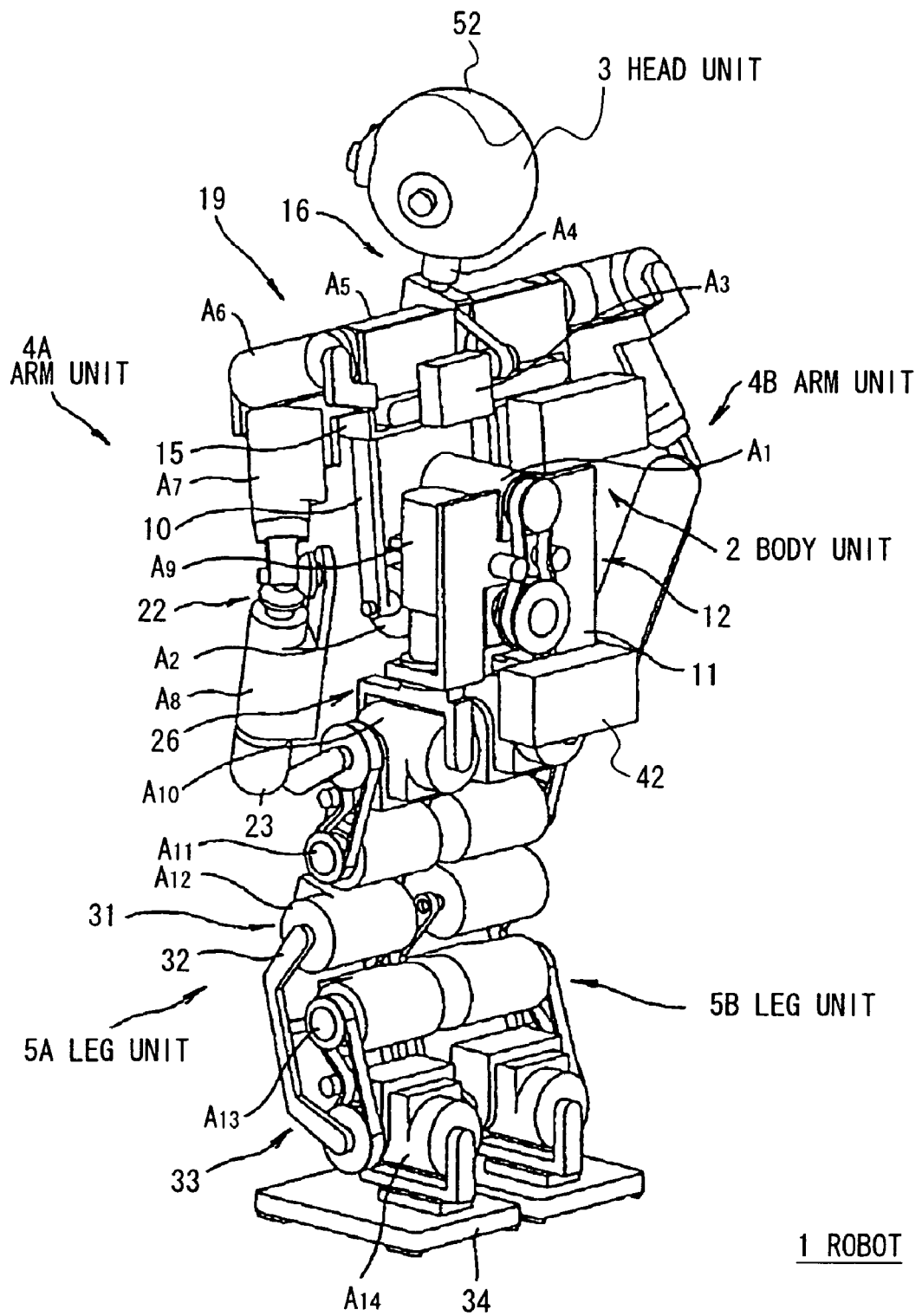
FIG. 2 is a perspective diagram showing the external construction of a robot in this embodiment.

In FIGS. 1 and 2, reference numeral 1 shows the whole of a two-footed walking robot in this embodiment, wherein a head unit 3 is placed on a body unit 2, and arm units 4A, 4B of the same construction are arranged at the upper left and right sides of the body unit 2 respectively, and leg units 5A, 5B of the same construction are fixed in place at the lower left and right sides of the body unit 2 respectively.

Figure 3:
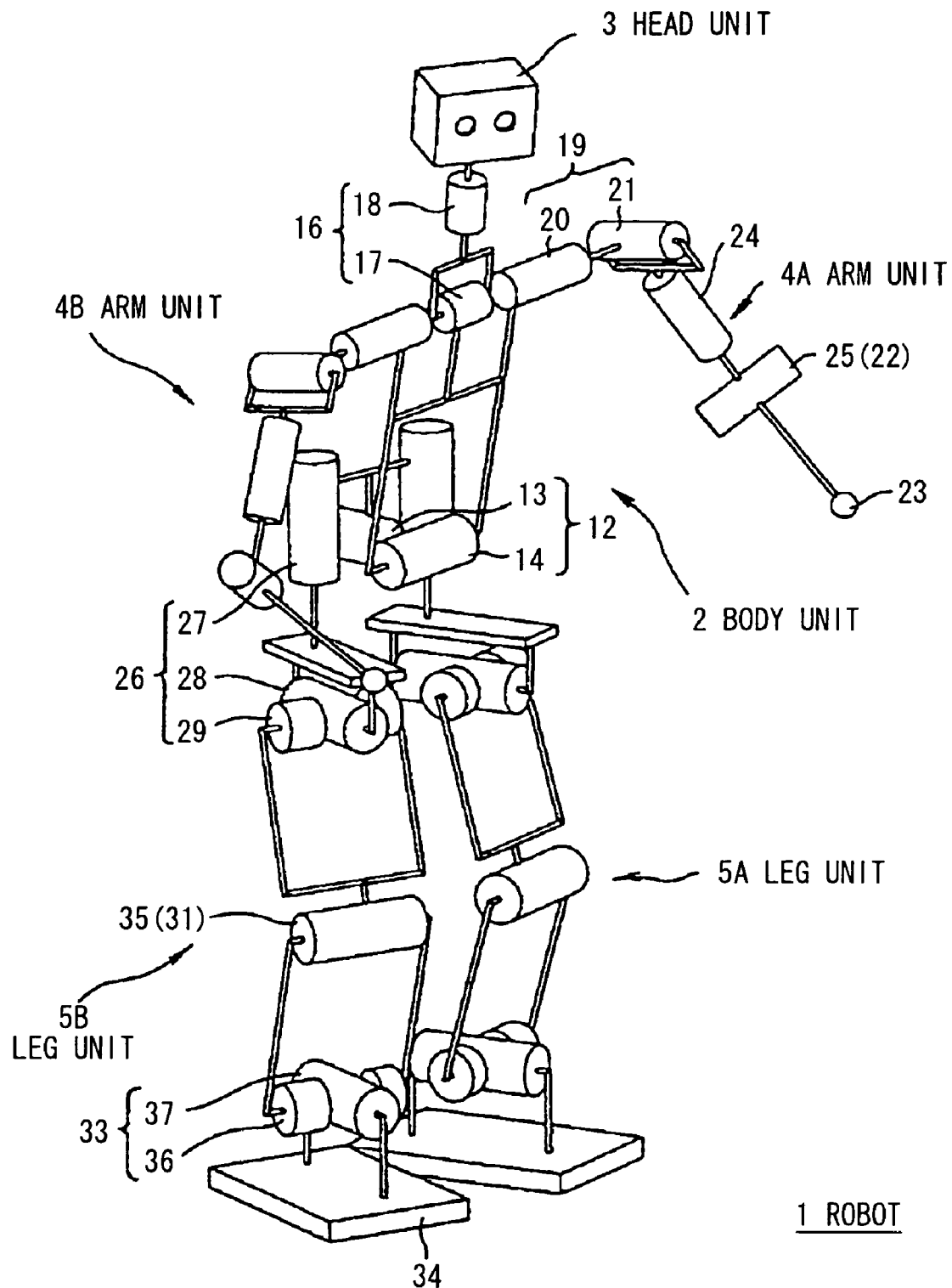
FIG. 3 is a schematic diagram used in explaining the external construction of a robot in this embodiment.

The body unit 2 is constructed of a frame 10 forming the upper body and a waist base 11 forming the lower body, both of which are connected via a waist joint mechanism 12, and it is designed such that the upper body can be rotated independently around each of a roll axis 13 and a pitch axis 14, orthogonal to one another as shown in FIG. 3, by driving each actuator $A_1$, $A_2$ of the waist joint mechanism 12 fixed on the waist base 11 of the lower body.

Also, the head unit 3 is fixed on the center upper part of a shoulder base 15 fixed on the upper end of the frame 10 via a neck joint mechanism 16, and is designed to be able to rotate independently around each of a pitch axis 17 and a yaw axis 18, orthogonal to one another as shown in FIG. 3, by driving each actuator $A_3$, $A_4$ of the neck joint mechanism 16.

Furthermore, the arm units 4A, 4B are fixed onto the left and right of the shoulder base 15 respectively via a shoulder joint mechanism 19, and designed to be able to rotate independently around each of a pitch axis 20 and a roll axis 21, orthogonal to one another as shown in FIG. 3, by driving each of the actuators $A_5$, $A_6$ of the corresponding shoulder joint mechanism 19.

In this case, as to each arm unit 4A, 4B, the output axis of an actuator $A_7$ forming an upper arm is linked with an actuator $A_8$ forming a forearm via an elbow joint mechanism 22, and a hand unit 23 is attached to the front end of the forearm.

And, as to the arm unit 4A, 4B, it is designed such that the forearm can rotate around a yaw axis 24 shown in FIG. 3 by driving the actuator $A_7$, and around a pitch axis 25 shown in FIG. 3 by driving the actuator $A_8$.

On the other hand, each leg unit 5A, 5B is attached to the waist base 11 of the lower body via a hip joint mechanism 26, and it is designed such that each leg unit 5A, 5B can rotate independently around a yaw axis 27, roll axis 28, and a pitch axis 29 shown in FIG. 3, orthogonal to one another, by driving each actuator $A_9$-$A_{11}$ of the corresponding hip joint mechanism 26.

In this case, the construction is designed such that as to each leg unit 5A, 5B, a frame 32 forming the lower leg is linked to the low end of the frame 30 forming the femoral region via a knee joint mechanism 31, and a foot unit 34 is linked with the low end of the frame 32 via an ankle joint mechanism 33.

Therefore, as to the leg unit 5A, 5B, it is designed such that the lower leg can rotate around a pitch axis 35 shown in FIG. 3 by driving an actuator $A_{12}$ forming the knee joint mechanism 31, and that the foot unit 34 can rotate independently around a pitch axis 36 and a roll axis 37 shown in FIG. 3, orthogonal to each other, by driving the actuators $A_{13}$-$A_{14}$ of the ankle joint mechanism 33.

Figure 4:
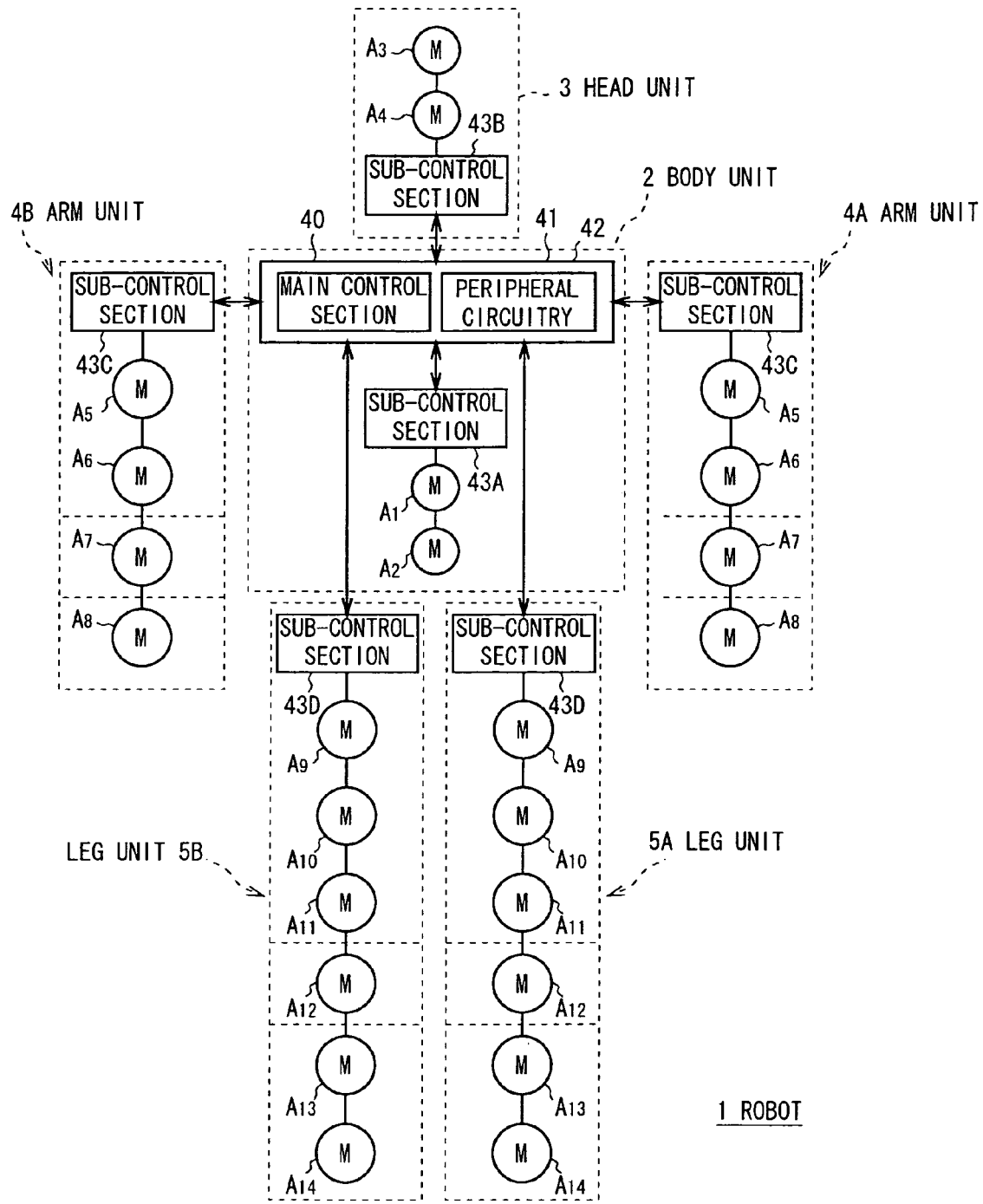
FIG. 4 is a schematic diagram used in explaining the internal construction of a robot in this embodiment.

On the other hand, as shown in FIG. 4, on the back of the waist base 11 forming the lower body of the body unit 2, is arranged a box of a control unit 42 housing a main control unit 40 for controlling entire operation of the whole robot 1, peripheral circuitry 41 including the power circuits and communication circuits, a battery 45 (FIG. 5), etc.

And this control unit 42 is connected to sub-control units 43A-43D arranged within each constituent unit (body unit 2, head unit 3, arm unit 4A, 4B, and leg unit 5A, 5B), and designed to be able to conduct operation such as supplying necessary power voltages to these sub-control units 43A-43D and communicating with these sub-control units 43A-43D.

Also, connected to each actuator $A_1$-$A_{14}$ of the corresponding constituent unit, each sub-control unit 43A-43D is designed to be able to drive each actuator $A_1$-$A_{14}$ of the corresponding constituent unit in a manner specified via various commands given from the main control unit 40.

Figure 5:
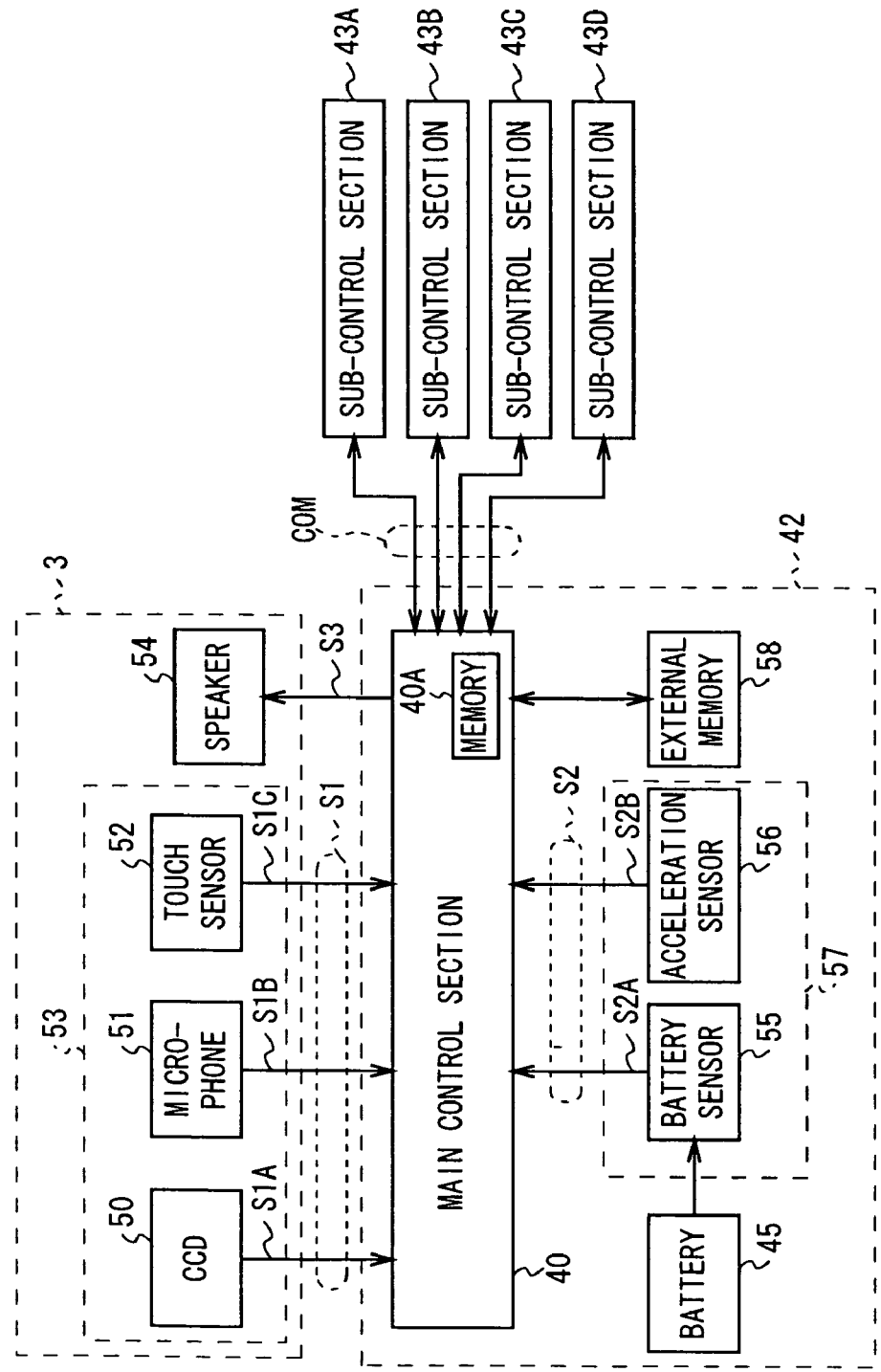
FIG. 5 is a schematic diagram used in explaining the internal construction of a robot in this embodiment.

Furthermore, as shown in FIG. 5, at predetermined positions on the head unit 3 are arranged components such as an external sensor unit 53 composed of a CCD (Charge Coupled Device) camera 50 functioning as "eyes", and a microphone 51 as "ears" of the robot 1, and a touch sensor 52, and a loudspeaker 54 as a "mouth", and inside the control unit 42 is arranged an internal sensor unit 57 composed of a battery sensor 55 and an acceleration sensor 56.

And, the CCD camera 50 of the external sensor unit 53 captures surrounding environment, and a captured video signal S1A is sent to the main control unit, while the microphone 51 collects user voice indicative of various commands such as "Walk", "Lie down", and "Chase the ball", given as audio inputs, and sends an audio signal S1B obtained to the main control unit 40.

Also, the touch sensor 52 is located on the top of the head unit 53 as is apparent from FIGS. 1 and 2, and it detects received pressures produced as a result of physical influence such as "stroke" and "pat" exerted by the user, and the detection result is sent to the main control unit 40 as a pressure detection signal S1C.

Furthermore, the battery sensor 55 in the internal sensor unit 57 detects the energy level of the battery 45 at predetermined intervals, and the detection result is sent to the main control unit 40 as a battery level detection signal S2A, while the acceleration sensor 56 detects the acceleration in the direction of three (3) axes (x axis, y axis, and z axis) at predetermined intervals, and the detection result is sent to the main control unit 40 as an acceleration detection signal S2B.

The main control unit 40 judges the surrounding and internal situations of the robot 1, commands from the user, the existence of influence from the user, etc. based on the video signal S1A, the audio signal S1B, the pressure detection signal S1C, etc. (They are lumped together and referred to as "external sensor signal S1" hereinafter.) supplied respectively from the CCD camera 50, the microphone 51, the touch sensor 52, etc. of the external sensor unit 53, and the battery level detection signal S2A, the acceleration detection signal S2B, etc. (They are lumped together and referred to as "internal sensor signal S2" hereinafter) supplied respectively from the battery sensor 55, the acceleration sensor, etc. of the internal sensor unit 57.

Then the main control unit 40 determines a subsequent action based on the judged results, a control program stored beforehand in an internal memory 40A, and various control parameters stored in an external memory 58 being installed, and sends control commands based on the determined results to relevant sub-control units 43A-43D. As a result, the corresponding actuators $A_1$-$A_{14}$ are set in motion based on the control commands and under the control of the sub-control units 43A-43D, thus letting the robot 1 take action, such as moving the head unit 3 up and down, left to right, raising the arm units 4A, 4B, and walking.

At this juncture, the main control unit 40 also feeds a predetermined audio signal S3 to the loudspeaker 54, as required, to output sounds based on the audio signal S3, or feeds a driving signal to LEDs functioning as the "eyes" in appearance, placed at the predetermined positions on the head unit 3, to make the LEDs flash.

Thus the robot 1 is designed to be capable of behaving autonomously based on the surrounding and internal situations, commands, and the existence of influence from the user.

(2) Processing of Main Control Unit 40 regarding Name-Learning Function

Next, Explanation is given on a Name-learning Function Installed on the Robot 1

This robot 1 is installed with a name-learning function to obtain and learn the name of a person in association of the person (This process is referred to as "name-learning" hereinafter.) in a way that it obtains the name of a person through dialog with that person and stores that name in association with the data of each of the acoustic characteristics of the voice and the morphological characteristics of the person detected based on the outputs from the microphone 51 and the CCD camera 50, and then finds a new person showing up, whose name is not obtained yet, based on the stored data, and obtains and stores the name, the acoustic characteristics of the voice and the morphological characteristics of the new person in the same manner as above. It should be noted hereinafter that a person whose name is stored in association with the acoustic characteristics of the voice and the morphological characteristics of that person is referred to as a "known person", and a person whose name is not stored yet as a "new person".

And, this name-learning function is realized by a variety of processes in the main control unit 40.

Figure 6:
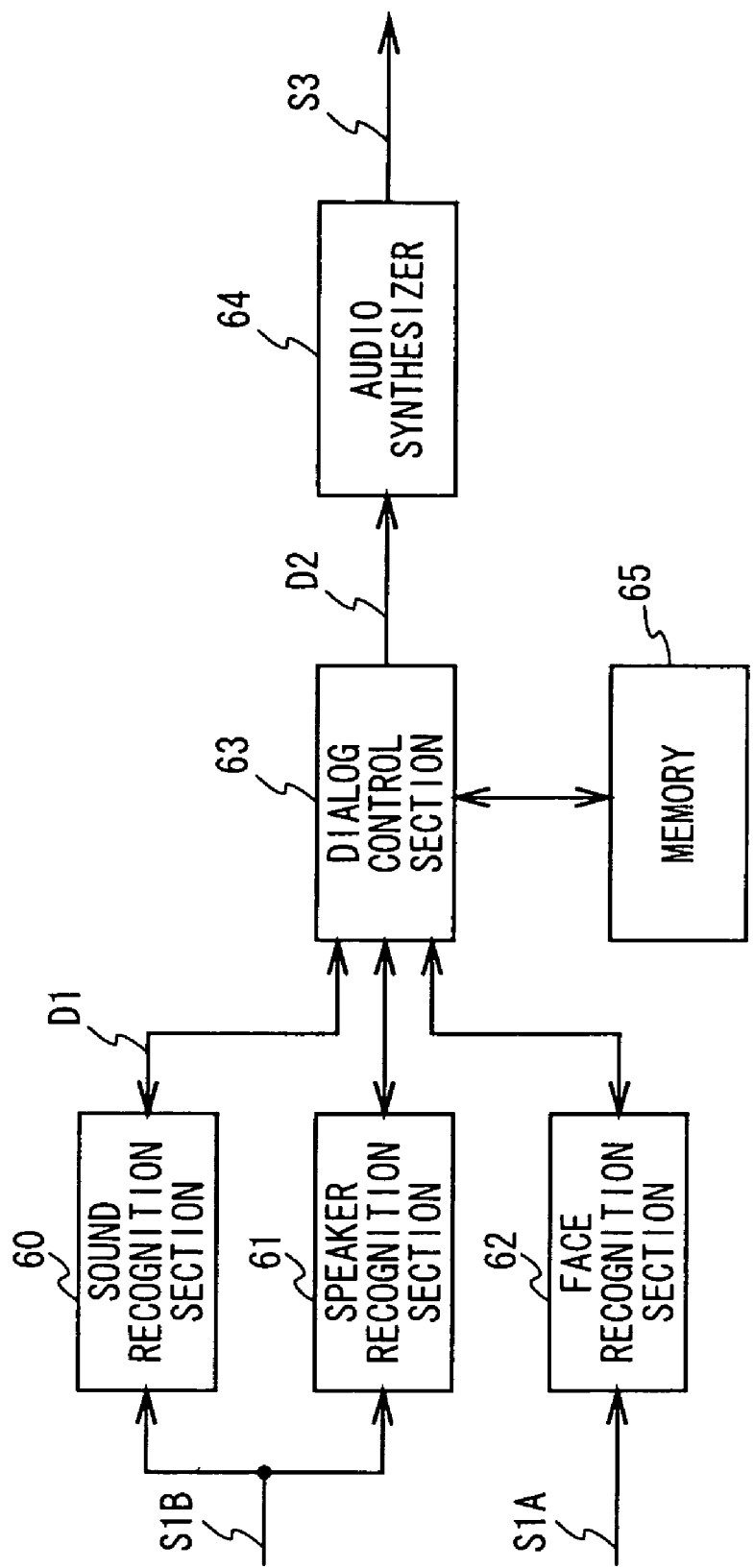
FIG. 6 is a block diagram used in explaining the processing of the main control section 40 regarding the name learning function.

Here, the processing contents of the main control unit 40 regarding such a name-learning function can be divided functionally as follows, as shown in FIG. 6: a sound recognition section 60 for recognizing words uttered by a person; a speaker recognition section 61 for detecting the acoustic characteristics of the voice of a person, and for identifying and recognizing the person based on the detected acoustic characteristics; a face recognition section 62 for detecting the morphological characteristics of the face of a person, and for identifying and recognizing that person based on the detected morphological characteristics; a dialog control section 63 in charge of various controls for the name-learning of a new person including controlling dialog with a person, and of storage management of the name, the acoustic characteristics of the voice, and the morphological characteristics of the face of a known person; and an audio synthesizer 64 for generating and sending to the loudspeaker 54 (FIG. 5) an audio signal S3 for a variety of dialog under the control of the dialog control section 63.

In this case, the sound recognition section 60 has a function to recognize words contained in an audio signal S1B word by word by performing a predetermined sound recognition process based on the audio signal S1B from the microphone 51 (FIG. 5), and it is designed such that the recognized words are sent to the dialog control section 63 as character string data D1.

Also, the speaker recognition section 61 has a function to detect the acoustic characteristics of the voice of a person from the audio signal S1B supplied from the microphone 51 by predetermined signal processing utilizing such a method as described, for example, in the "Segregation of Speakers for Recognition and Speaker Identification (CH2977-7/91/0000-0873 S1.00 1991 IEEE").

And, in normal times the speaker recognition section 61 compares the data of the detected acoustic characteristics sequentially with the data of the acoustic characteristics of all the known persons stored, and when the acoustic characteristics detected at that time coincide with those of any known person, the speaker recognition section 61 notifies the dialog control section 63 of a specific identifier (This is referred to as "SID" hereinafter.) affixed to the acoustic characteristics associated with the acoustic characteristics of that known person, while when the detected acoustic characteristics do not coincide with the acoustic characteristics of any known person, SID (=−1) denoting recognition impossible is conveyed to the dialog control section 63.

Also, when the dialog control section 63 judges that person to be a new person, the speaker recognition section 61 detects the acoustic characteristics of the voice of that person during a period of time based on the start command and the end command for new learning given from the dialog control section 63, and the data of the detected acoustic characteristics is stored in association with a new specific SID, and this SID is conveyed to the dialog control section 63.

It should be noted that the speaker recognition section 61 is designed to be capable of performing addition-learning, namely additionally collecting the data of the acoustic characteristics of the voice of that person as well as correction-learning, namely correcting the data of the acoustic characteristics of the voice of that person in response to start and end commands given from the dialog control section 63 for addition-learning or correction-learning so that that person may be recognized correctly.

The face recognition section 62 has a function to always watch the video signal S1A given by the CCD camera 50 (FIG. 5), and to detect the morphological characteristics of the face of a person included in the image based on the video signal S1A with prescribed signal processing.

Then, in normal times the face recognition section 62 compares the data of the detected morphological characteristics sequentially with the data of the morphological characteristics of the faces of all the known persons stored, and when the morphological characteristics detected at that time coincide with those of any known person, the face recognition section 62 notifies the dialog control section 63 of an specific identifier (This is referred to as "FID" hereinafter.) affixed to the morphological characteristics associated with the morphological characteristics of that known person, while when the detected morphological characteristics do not coincide with the morphological characteristics of the face of any known person, FID (=−1) denoting recognition impossible is conveyed to the dialog control section 63.

Also, when the dialog control section 63 judges that person to be a new person, the face recognition section 62 detects the morphological characteristics of the face of that person included in the image based on the video signal S1A given from the CCD camera 50 during a period of time based on a learning start command and a learning end command given from the dialog control section 63, and the data of the detected morphological characteristics is stored in association with a new specific FID, and this FID is conveyed to the dialog control section 63.

It should be noted that the face recognition section 62 is designed to be capable of performing addition-learning, namely additionally collecting the data of the morphological characteristics of the face of that person as well as correction-learning, namely correcting the data of the morphological characteristics of the face of that person in response to start and end commands given from the dialog control section 63 for addition-learning or correction-learning so that that person may be recognized correctly.

The audio synthesizer 64 has a function to convert character string data D2 given from the dialog control section 63 into an audio signal S3, and the audio signal S3 thus obtained is sent out to the loudspeaker 54 (FIG. 5). Therefore, it is designed such that sound based on the audio signal S3 can be output from by the loudspeaker 54.

As shown in FIG. 7, the dialog control section 63 has a memory 65 (FIG. 6) to store the name of a known person and the SID associated with the data of the acoustic characteristics of the voice of that person stored in the speaker recognition section 61, in relation to the FID associated with the data of the morphological characteristics of the face of that person stored in the face recognition section 62.

Then it is designed such that the dialog control section 63 gives predetermined character string data D2 to the audio synthesizer 64 at suitable timing to output sound from the loudspeaker 54, so as to ask a conversational partner's name or to confirm his name, and that it judges whether or not that person is a new person on the basis of each recognition result produced by the sound recognition section 60 and the speaker recognition section 61 based on the response, etc. from that person at that time and the recognition result of that person produced by the face recognition section 62, and the names of the aforementioned known persons and the associative information of the SID and FID stored in the memory 65.

Subsequently, when that person is judged to be a new person, the dialog control section 63 lets the speaker recognition section 61 and the face recognition section 62 collect and store the data of the acoustic characteristics of the voice and the morphological characteristics of the face of that new person by giving a start command and an end command for new learning to the speaker recognition section 61 and the face recognition section 62, with the result that SID and FID associated with the data of the acoustic characteristics of the voice and the morphological characteristics of the face of that new person given respectively from the speaker recognition section 61 and the face recognition section 62 are stored in the memory 65 related to the name of that person obtained from the dialog.

Also, when that person is judged to be a known person, the dialog control section 63 lets the speaker recognition section 61 and the face recognition section 62 perform addition-learning and correction-learning by giving a start command for addition-learning and correction-learning, as required, while it is designed such that the dialog control section 63 performs dialog controlling so that the chat with that person is protracted until the speaker recognition section 61 and the face recognition section 62 can collect a proper amount of data necessary for addition-learning and correction-learning by sending out predetermined character string data D2 sequentially at suitable timing to the audio synthesizer 64.

(3) Concrete Processing of Dialog Control Section 63 Regarding Name-Learning Function Next, explanation is given on concrete contents processed by the dialog control section 63 regarding the name-learning function.

Figure 8:
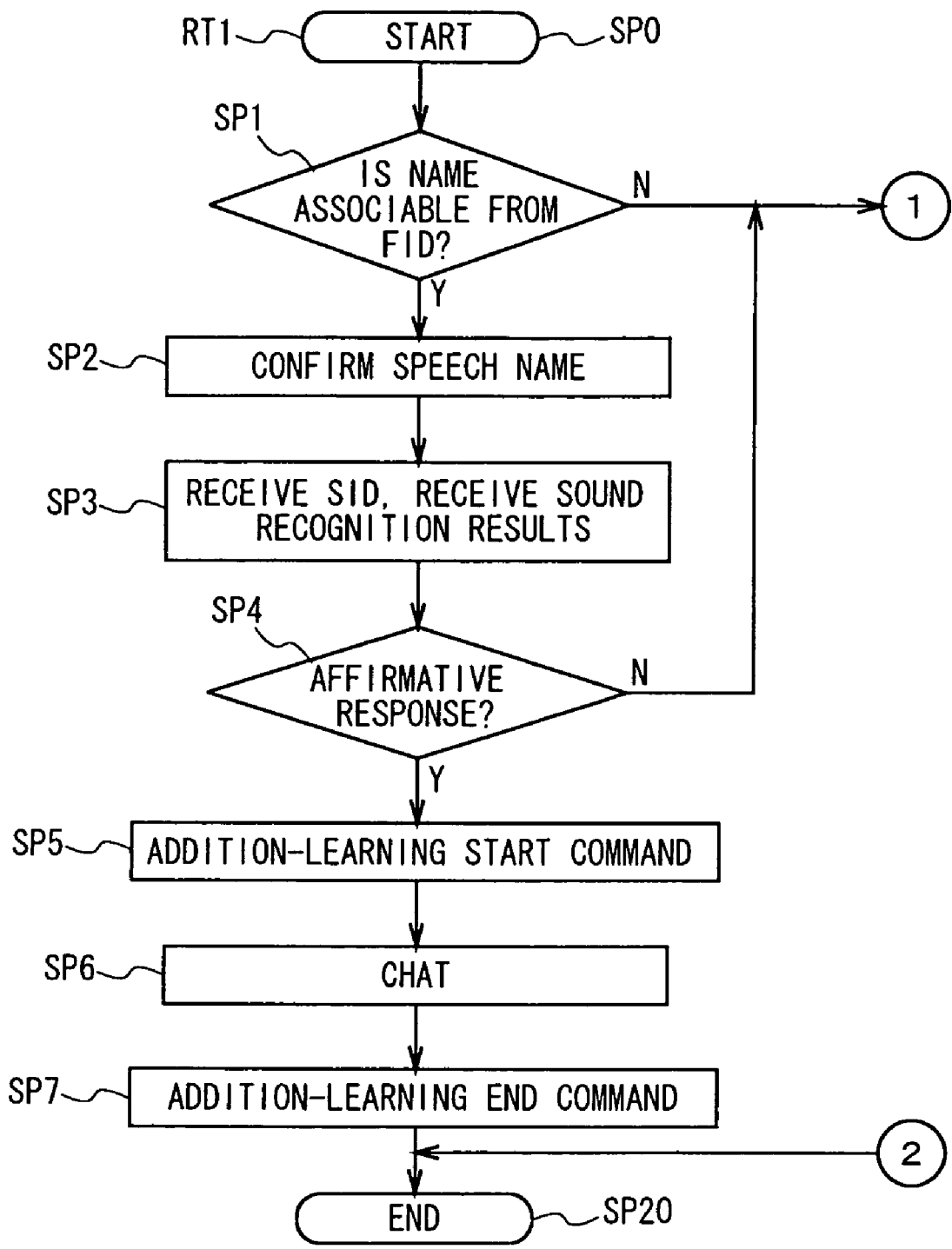
FIG. 8 is a flowchart showing for a name-learning processing routine.
Figure 9:
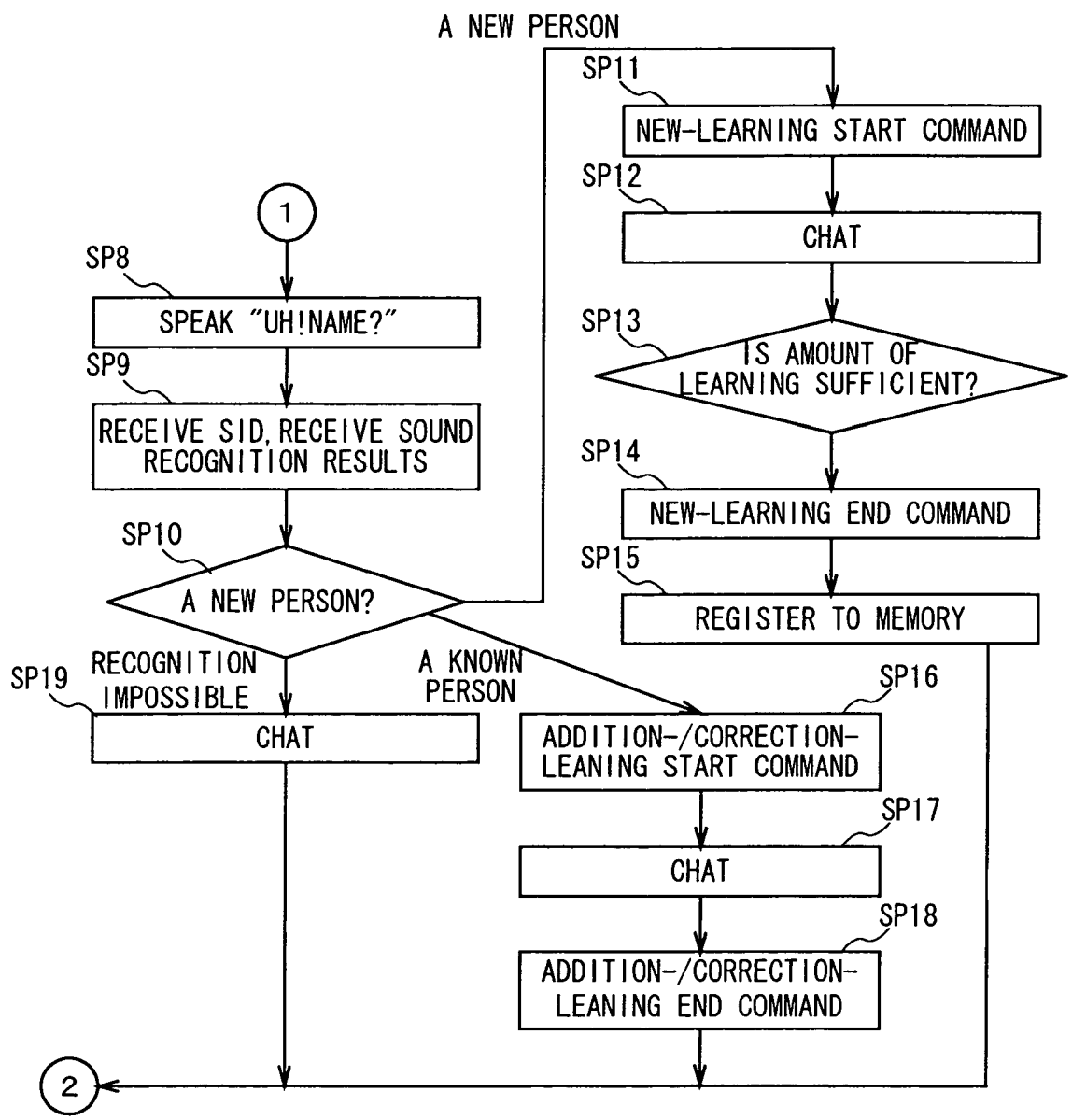
FIG. 9 is a flowchart showing for a name-learning processing routine.

The dialog control section 63 performs various processes for learning the names of new persons in order, according to the name-learning processing routine RT1 described in FIGS. 8 and 9 based on a control program stored in the external memory 58 (FIG. 5).

That is, when FID is given from the face recognition section 62 since the face recognition section 62 recognizes the face of a person based on a video signal S1A coming from the CCD camera 50, the dialog control section 63 starts the name-learning processing routine RT1 in step SP0, and judges in the following step SP1 whether or not it is possible to search for the name corresponding to the FID (That is, it is judged whether or not the FID is "−1" meaning recognition impossible.) based, on the information, stored in the memory 65, relating the names of the known persons with the corresponding SID and FID (This is referred to as "associative information hereinafter.).

Now, obtaining an affirmative result in this step SP1 means that that person is a known person with the data of the morphological characteristics of the face of that person stored in the face recognition section 62 and with the FID corresponding to the data stored in the memory 65 related to the name of that person. In this case, too, however, it could be thought that the face recognition section 62 recognized a new person as a known person by mistake.

Then, when an affirmative result is obtained in step SP1, the processing proceeds to step SP2, where the dialog control section 63 sends the predetermined character string data D2 to the audio synthesizer 64, thereby it lets the loudspeaker 54 output sound for questions like, "You are oo-san, aren't you?" as shown in FIG. 10, to confirm whether or not the name of that person coincides with the name (corresponding to oo-san in the above example) detected using the FIDs.

Subsequently, the processing goes to step SP3, where the dialog control section 63 stands by for the sound recognition result of that person's answer to the questions, like "Yes, I am.", or "No, I am not.", which is expected to come from the sound recognition section 60. Then, when such a sound recognition result is given from the sound recognition section 60, or SID of a speaker recognition result at that time is given from the speaker recognition section 61, the processing proceeds to step SP4, where the dialog control section 63 judges based on the sound recognition result from the sound recognition section 63 whether or not the answer of that person is in the affirmative.

Obtaining an affirmative result in step SP4 means that the name retrieved based on the FID given from the face recognition section 62 in step SP1 coincides with the name of that person, and that it is now concluded that that person is the real person in question having the name the dialog control section 63 has retrieved.

Thus the dialog control section 63 concludes at this moment that that person is the person in question having the name the dialog control section 63 has retrieved, and proceeds to step SP5, where a start command for addition-learning is given to the speaker recognition section 61. At the same time, when the SID given first from the speaker recognition section 61 coincides with SID retrievable using that name based on the associative information stored in the memory 65, the dialog control section 63 gives a start command for addition-learning to the speaker recognition section 61, whereas, when it does not coincide, a start command for correction-learning is given.

Subsequently the processing goes on to step SP6, where the dialog control section 63 sends to the audio synthesizer 64 sequentially character string data D2 to have small talk made continuously to prolong the dialog with that person, like "It's fine today, isn't it?" as shown in FIG. 10, for example, and after a predetermined period of time enough for addition-learning or correction-learning has elapsed, the processing proceeds to step SP7, where an end command for addition-learning or correction-learning is issued to the speaker recognition section 61 and the face recognition section 62, with the processing proceeding to step SP20, where the process of name-learning for that person ends.

On the other hand, obtaining a negative result in step SP1 means that a person whose face is recognized by the face recognition section 62 is a new person, or that the face recognition-section 62 has recognized a known person as a new person by mistake. Also, obtaining a negative result in step SP4 means that the name retrieved using the FIDs given first from the face recognition section 62 does not coincide with the name of that person. And, in either case, the dialog control section 63 is assumed to be not in a state of grasping that person correctly.

Then, when a negative result is obtained in step SP1, or when a negative result is obtained in step SP4, the processing proceeds to step SP8, where the dialog control section 63 feeds the character string data D2 to the audio synthesizer 64, thereby letting the loudspeaker 54 output sound for a question like "Uh, may I have your name, please?" as shown in FIG. 11, for example, in order to get the name of that person.

Then the processing proceeds to step SP9, where the dialog control section 63 stands by for a sound recognition result (namely, a name) of the answer to the question of that person, like "I am oo." and a speaker recognition result (namely, a SID) of the speaker recognition section 61 at the time of answering, to be given from the sound recognition section 60 and the speaker recognition section 61 respectively.

Then, when a sound recognition result is given from the sound recognition section 60, and SID from the speaker recognition section 61, the processing proceeds to step SP10, where the dialog control section 63 judges whether or not that person is a new person, based on the sound recognition result and the SID as well as the FID given first from the face recognition section 62.

In this case of this embodiment, the above judgment is made by a majority decision of three recognition results: the name obtained as a result of sound recognition by the sound recognition section 60, the SID from the speaker recognition section 61, and the FID from the face recognition section 62.

For example, when both the SID from the speaker recognition section 61 and the FID from the face recognition section 62 denote "−1" meaning recognition impossible, and when the name of that person obtained in the above step based on the sound recognition result from the sound recognition section 60 is not associated with any SID and FID in the memory 65, the person is judged to be a new person. That judgment can be made in the light of the situation where a person resembling neither of the face and the voice of any known person is possessed of quite a new name.

On the other hand, when the SID from the speaker recognition section 61 and the FID from the face recognition section 62 are associated with a different name in the memory 65 or either of them denotes "−1" meaning recognition impossible, and when the name of that person obtained based on the sound recognition result from the sound recognition section 60 in step SP9 is not stored in the memory 65, the dialog control section 63 judges that person to be a new person. This is because in the steps of various recognition processes that person may be judged to be a new person with a fairly high degree of confidence since a new category is easy to be wrongly recognized for any of known categories and in consideration of the fact that the name audibly recognized is not registered.

As against it, when the SID from the speaker recognition section 61 and the FID from the face recognition section 62 are associated with the same name in the memory 65, and when the name of that person obtained based on the sound recognition result from the sound recognition section 60 in step SP9 is the name associated with the SID and the FID, the dialog control section 63 judges that person to be a known person.

Also, when the SID from the speaker recognition section 61 and the FID from the face recognition section 62 are associated with different names in the memory 65, and when the name of that person obtained based on the sound recognition result from the sound recognition section 60 in step SP9 is a name associated with either of SID and FID, the dialog control section 63 judges that person to be a known person. In this case, the judgment is made by the majority decision because either of the recognition results by the speaker recognition section 61 and the face recognition section 62 may be supposed to be in the wrong.

Meantime, when the SID from the speaker recognition section 61 and the FID from the face recognition section 62 are associated with different names in the memory 65, and when the name of that person obtained based on the sound recognition result from the sound recognition section 60 in step SP9 is a name not associated with either of the SID and the FID in the memory 65, the dialog control section 63 does not make judgment on whether that person is a known person or a new person. In this case, it could be thought that any or all of the sound recognition section 60, the speaker recognition section 61 and the face recognition section 62 made wrong recognition, but it is impossible to judge which one is wrong at this stage. In this case, therefore, the judgment is put on hold.

Following such a judgment process, when that person is judged to be a new person in step S10, the processing proceeds to step SP11, where the dialog control section 63 gives a start command for new-learning to the speaker recognition section 61 and the face recognition section 62, and then the processing goes on to step SP12, where the dialog control section 63 sends to the audio synthesizer 64 character string data D2 to have conversation kept going so as to protract the chat with that person, for example, "I am Robot. I am glad to meet you.", or "oo-san, it's fine today, isn't it?" as shown in FIG. 11.

Subsequently the processing moves on to step SP13, where the dialog control section 63 judges whether or not the collection of both the data of the acoustic characteristics in speaker recognition section 61 and the data of the morphological characteristics of the face in the face recognition section 62 has come up to a sufficient amount, and if a negative result is obtained, the processing returns to step SP12, and subsequently repeats a loop of steps SP12-SP13-SP12 until an affirmative result is obtained in step SP13.

When an affirmative result is obtained in step SP13 with both the collection of the data of the acoustic characteristics in the speaker recognition section 61 and the morphological characteristics of the face in the face recognition section 62 coming up to a sufficient amount, the processing proceeds to step SP14, where the dialog control section 63 gives an end command for new-learning to the speaker recognition section 61 and the face recognition section 62. As a result, the data of the acoustic characteristics is stored in the speaker recognition section 61, associated with a new SID, and the data of the morphological characteristics in the face recognition section 62, a new FID.

Subsequently the processing proceeds to step SP15, where the dialog control section 63 stands by for SID and FID to be given respectively from the speaker recognition section 61 and the face recognition section 62, and with them given in due course, as shown in FIG. 12, for example, they are registered in the memory 65, associated with the name of that person obtained in step SP9 based on the sound recognition result from the sound recognition section 60. Then the processing in the dialog control section 63 moves on to step SP20, and the processing of name-learning for that person ends.

On the other hand, when that person is judged to be a known person in step SP10, the processing proceeds to step SP16, and when the speaker recognition section 61 and the face recognition section 62 could judge that known person correctly (that is, when the speaker recognition section 61 and the face recognition section 62 have output as the recognition result the same SID or FID as the SID or SID, corresponding to that known person stored as the associative information in the memory 65), the dialog control section 63 gives a start command for addition-learning to the speaker recognition section 61 or the face recognition section 62, and when the speaker recognition section 61 and the face recognition section 62 could not recognize that known person correctly (when the speaker recognition section 61 and the face recognition section 62 have output, as the recognition result, the same SID or FID as the SID or SID, as the recognition results, corresponding to that known person stored as the associative information in the memory 65), the dialog control section 63 gives a start command for correction-learning to the speaker recognition section 61 or the face recognition section 62.

To be more specific, when the SID obtained in step SP9 from the speaker recognition section 61 and the FID given first from the face recognition section 62 are associated with the same name in the memory 65, and at the same time, when that person is judged to be a known person in step SP10 in the light of the fact that the name obtained based on the sound recognition result from the sound recognition section 60 in step SP9 is a name associated with the SID and the FID, the dialog control section 63 gives a start command for addition-learning to both the speaker recognition section 61 and the face recognition section 62.

Also, when the SID obtained in step SP9 from the speaker recognition section 61 and the FID given first from the face recognition section 62 are associated with different names in the memory 65, and at the same time, when that person is judged to be a known person in step SP10 in the light of the fact that the name obtained based on the sound recognition result from the sound recognition section 60 in step SP9 is a name associated with one of the SID and the FID, the dialog control section 63 gives a start command for addition-learning to either the speaker recognition section 61 or the face recognition section 62 that has produced an output of the SID or the FID associated with the name obtained based on the sound recognition result from the sound recognition section 60, and gives a start command for correction-learning to either the speaker recognition section 61 or the face recognition section 62 that has produced an output of the SID or the FID not associated with the name obtained based on the sound recognition result from the sound recognition section 60.

Subsequently the processing goes on to step SP17, where the dialog control section 63 sends out a series of character string data D2 in succession to the audio synthesizer 64 to have the chat held so as to protract the dialog with that person, for example, "Uh, you are oo-san, aren't you? I remembered you. It's fine today, isn't it?", or "When did we meet last time?", as shown in FIG. 13, and after a predetermined and sufficient period of time for addition-learning and correction-learning elapsed, the processing proceeds to step SP18, where an end command for addition-learning or correction-learning is issued to the speaker recognition section 61 or the face recognition section 62, then the processing moves on to step SP20 terminating the name-learning processing for that person.

Meanwhile, when the dialog control section 63 judges in step SP10 that it is impossible to determine which that person is, a known person or a new person, the processing proceeds to step SP19, and a series of character string data D2 is sent out in succession to the audio synthesizer 64 to have chat held like: "oh, is it? How are you?" as shown in FIG. 14, for example.

And, in this case, the dialog control section 63 does not give a start command or an end command for new-learning, addition-learning, or correction-learning to the speaker recognition section 61 or the face recognition section 62 (That is, neither the speaker recognition section 61 nor the face recognition section 62 is let to perform any of new-learning, addition-learning, and correction-learning.), and in a predetermined period of time the processing proceeds to step SP20 terminating the name-learning processing for that person.

In this manner, the dialog control section 63 is designed to be capable of learning the names of new persons in succession by controlling dialog with a person and controlling the operation of the speaker recognition section 61 and the face recognition section 62, based on the recognition results by the sound recognition section 60, the speaker recognition section 61, and the face recognition section 62.

(4) Concrete Configuration of Sound Recognition Section 60 and Face Recognition Section 62

Next, explanation is given on the concrete configuration of the sound recognition section 60 and the face recognition section 62 to embody the name-learning function as described above.

(4-1) Concrete Configuration of Sound Recognition Section 60

Figure 15:
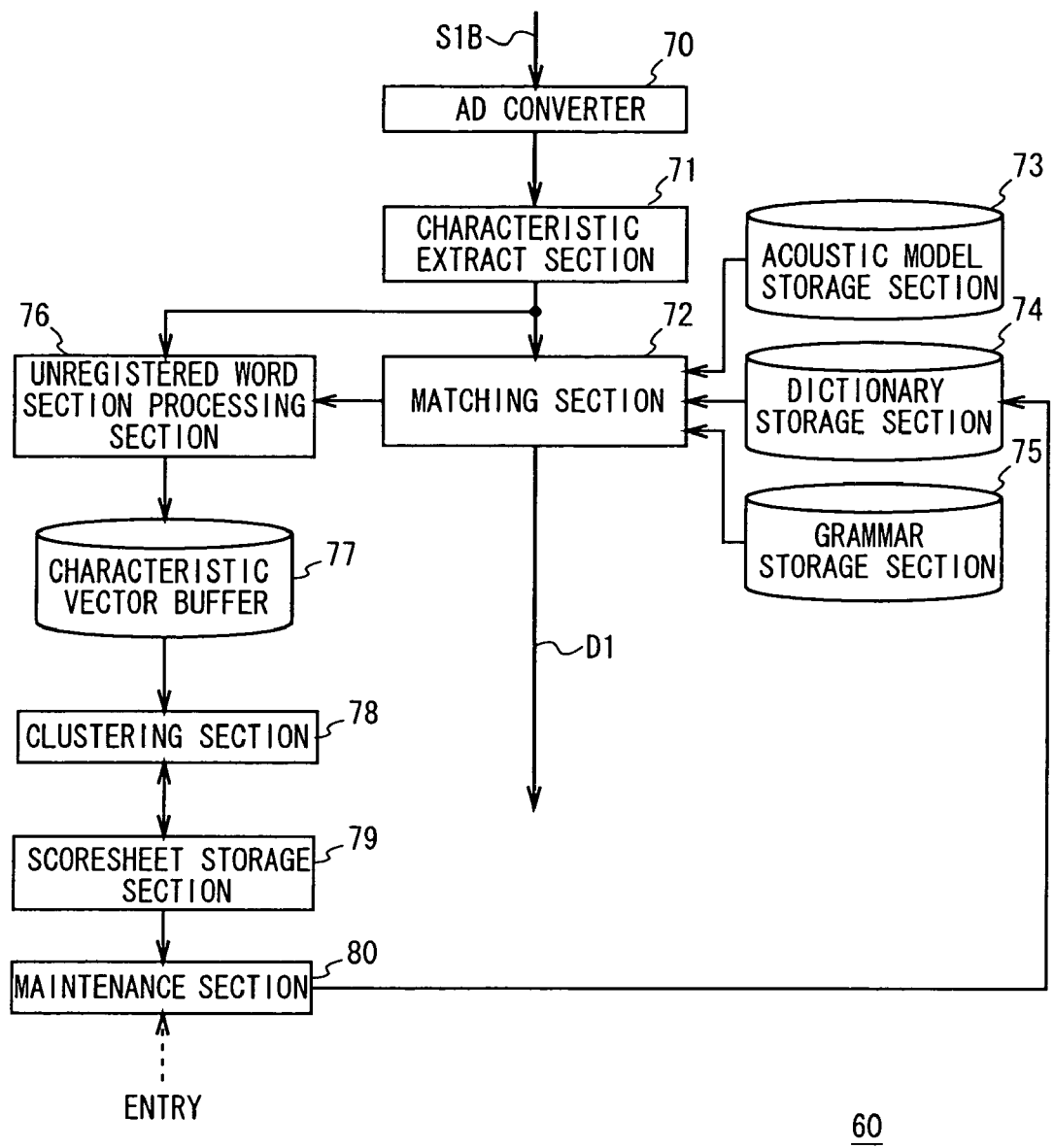
FIG. 15 is a block diagram showing the structure of a sound recognition section.

FIG. 15 shows the concrete configuration of the sound recognition section 60.

In this sound recognition section 60 an audio signal S1B from the microphone 51 is put into an AD (Analog Digital) converter 70. The AD converter 70 samples and quantizes the audio signal S1B of an analog signal supplied, which is A/D-converted into sound data of a digital signal. This sound data is fed to a characteristic extract section 71.

The characteristic extract section 71 performs, for example, MFCC (Mel Frequency Cepstrum Coefficient) analysis on sound data entered, on a proper frame basis, and outputs as a characteristic vector (a characteristic parameter) the MFCC to be obtained as a result of that analysis, to a matching section 72 and an unregistered word section processing section 76. Note that later it is possible for the characteristic extract section 71 to extract as a characteristic vector, for example, a linear prediction coefficient, a cepstrum coefficient, a line spectral pair, power for every predetermined frequency (output of the filter bank), etc.

The matching section 72 recognizes audio-wise sound (input sound) entered into the microphone 51 with the use of a characteristic vector from the characteristic extract section 71 on the basis of, for example, the continuous distribution HMM (Hidden Markov Model) method, referring, as needed, to an acoustic model storage section 73, a dictionary storage section 74, and a grammar storage section 75.

That is, the acoustic model storage section 73 stores acoustic models (for example, HMM, others including a standard pattern used for DP (Dynamic Programming) matching, etc.) representing acoustic characteristics of sub-words such as individual phonemes, syllables, and phonemics in a language of sound to be recognized. The HMM (Hidden Markov Model) is used as an acoustic model since sound recognition is performed here on the basis of the continuous distribution HMM method.

The dictionary storage section 74 recognizes a word dictionary in which information (acoustic information) regarding the pronunciation of a word, which is obtained through clustering for each unit for recognition, and the entry of the word are associated with each other.

Now, FIG. 16 shows a word dictionary stored in the dictionary storage section 74.

As shown in FIG. 16, with the entries of words and the phoneme series associated in the word dictionary clustering is instituted in the phoneme series for each corresponding word. In the word dictionary in FIG. 16 one entry (one line in FIG. 16) corresponds to one cluster.

Note that in FIG. 16 the entries are represented in both Roman letters and Japanese characters (Kana and Chinese characters), and the phoneme series in the Roman letters. "N" in the phoneme series denotes "N (ん)", a syllabic nasal in Japanese, however. Also, in FIG. 16 one phoneme series is described to one entry, it is possible to describe a plurality of phoneme series to one entry.

Returning to FIG. 4, the grammar storage section 26 stores the grammatical regulations describing how each word registered in the word dictionary of the dictionary storage section 25 is chained (linked).

FIG. 17 shows the grammatical regulations stored in the grammar storage section 75. Note that the grammatical regulations in FIG. 17 are described in EBNF (Extended Backus Naur Form).

In FIG. 17, a section from the beginning of a line to the appearance of ";" expresses one grammatical regulation. Also, a set of alphabetic letters (row) with "$" affixed to the beginning represents a variable, while a set of alphabetic letters (row) without "$" the entry of a word (the entries described in Roman letters in FIG. 16.). Moreover, a portion bracketed with a pair of [ ] may be omissible, and the mark [|] means that either of the headwords (variables) arranged before and after it should be selected.

Therefore, in FIG. 17, for example, in the grammatical regulation "$col =[Kono|sono] iro wa;" on the first line (the first line immediately below the top) the variable $col represents a word row of "Konoiro (color) wa", or "sonoiro (color) wa".

In the grammatical regulations shown in FIG. 17 the variable $sil and $garbage are not defined, however, the variable $sil represents a silent acoustic model (silent model), and the variable $garbage fundamentally a garbage model allowing free transition among phonemes.

Again returning to FIG. 15, the matching section 72 constitutes an acoustic model (word model) of a word by connecting acoustic models stored in the acoustic model storage section 73, referring to the word dictionary of the dictionary storage section 74. Furthermore, the matching section 72 connects several word models with reference to the grammatical regulations stored in the grammar storage section 75, and recognizes the sound entered into the microphone 51 with the use of such connected word models by means of the continuous distribution HMM method on the basis of a characteristic vector. That is, the matching section 72 detects the series of a word model whose characteristic vector of the time series outputted from the characteristic extract section 71 shows the highest observed score (likelihood), and outputs as the recognition result of the sound the entry of a word row corresponding to the series of that word model.

More specifically, the matching section 72 links the connected word models with the corresponding word, and recognizes a sound entered into the microphone 51 with the use of such connected word models by means of the continuous distribution HMM method on the basis of a characteristic vector. That is, the matching section 72 detects the series of a word model whose characteristic vector of the time series outputted from the characteristic extract section 71 shows the highest observed score (likelihood), and outputs as the recognition result of the sound the entry of a word row corresponding to the series of that word model.

More specifically, the matching section 72 accumulates the occurrence probabilities (output probabilities) of each characteristic vector as to a word row corresponding to the connected word models, and with the accumulated value as the score, outputs as the sound recognition result the entry of a word row that makes the score the highest.

The sound recognition result outputted as above and entered into the microphone 51 is outputted to the dialog control section 63 as the character string data D1.

In this embodiment in FIG. 17, there is a grammatical regulation "$pat1=$color1 $garbage $color 2; (This is referred to as "unregistered word regulation", wherever properly applicable hereinafter.), using the variable $garbage denoting a garbage model on the 9th line (9th below the top), and when this unregistered word regulation is applied, the matching section 72 detects a sound section corresponding to the variable $garbage as the sound section of an unregistered word. Moreover, the matching section 72 detects as the phoneme series of the unregistered word a phoneme series as the transition of phonemes in a garbage model the variable $garbage denotes when the unregistered word regulation is applied. Then, the matching section 72 supplies to the unregistered word section processing section 76 the sound section and phoneme series of an unregistered word to be detected when a sound recognition result is obtained as a result of the application of the unregistered word regulation.

Note that according to the aforementioned unregistered word regulation "$pat1=$color1 $garbage $color 2;" one unregistered word is detected between the phoneme series of a word (row) denoted by the variable #color1 registered in the word dictionary and the phoneme series of a word (row) denoted by the variable $color2 registered in the word dictionary, however, in this embodiment it also is possible to apply this unregistered word regulation even to the case of a speech containing a plurality of unregistered words as well as to the case of an unregistered word not being put between words (rows) registered to the word dictionary.

The unregistered word section processing section 76 holds the series of a characteristic vector (a characteristic vector series) temporarily supplied from the characteristic extract section 71. Furthermore, when the sound section and phoneme series of the unregistered word are received from the matching section 72, the unregistered word section processing section 76 detects the characteristic vector series of the sound in that sound section out of the characteristic vector series held temporarily. Then the unregistered word section processing section 76 assigns a unique ID (identification) to the phoneme series (unregistered word) from the matching section 72, which is supplied to a characteristic vector buffer 77, along with the phoneme series of the unregistered word and the characteristic vector series in the sound section.

The characteristic vector buffer 77 temporarily stores the unregistered word ID, phoneme series, and characteristic vector series supplied from the unregistered word section processing section 76, associated with one another as shown as an example in FIG. 18.

In FIG. 18, sequential numerals beginning with 1 are affixed to the unregistered words as the identifiers. Therefore, for example, in the case of the IDS of N pieces of unregistered words, the phoneme series, and the characteristic vector series being stored in the characteristic vector buffer 77, and when the matching section 72 detects the sound section of an unregistered word and the phoneme series, the number of N+1 is affixed to the unregistered word as the ID in the unregistered word section processing section 76, and the ID of the unregistered word, and the phoneme series, and the characteristic vector series are stored in the characteristic vector buffer 77 as indicated with a broken line in FIG. 18.

Returning again to FIG. 15, a clustering section 78 calculates the score of each of the other unregistered words (They are referred to as "new unregistered words" wherever properly applicable hereinafter.) already stored in the characteristic vector buffer 77 (They are referred to as "already-stored unregistered words" where properly applicable hereinafter.") as to the unregistered words already stored in the characteristic vector buffer 77 (They are referred to as "already-stored unregistered words" wherever properly applicable hereinafter.).

That is, with the new unregistered words as input sounds, and with the already-stored unregistered words regarded as words registered in the word dictionary, as done in the case with the matching section 72, the clustering section 78 calculates the score of the new unregistered word in relation to each of the already-stored unregistered words. More specifically, the clustering section 78 recognizes the characteristic vector series of the new unregistered words by referring to the characteristic vector buffer 77, and connects acoustic models according to the phoneme series of the already-stored unregistered words, and with those connected acoustic models the score is calculated as the likelihood with which the characteristic vector series of the new unregistered words is observed.

It should be noted that the acoustic models stored in the acoustic model storage section 73 are used for the purpose.

Likewise, the clustering section 78 calculates a score of each new unregistered word in respect to each of the already-stored unregistered words, and updates the scoresheet stored in a scoresheet storage section 79 with that score.

Furthermore, by referring to the updated scoresheet the clustering section 78 detects a cluster to which a new unregistered word is added as a new member out of clusters in which clustering is performed on an already obtained unregistered word (an already-stored unregistered word). Still furthermore, the clustering section 78 divides the cluster based on the members of that same cluster as a new member of the cluster in which the new unregistered word is detected, and based on the divided results the scoresheet stored in the scoresheet storage section 79 is updated.

The scoresheet storage section 79 stores the score of the new unregistered word in relation to the already-stored unregistered word, and the scoresheet to which the score and others of the already-stored unregistered word are registered in respect to the new unregistered word Here, FIG. 19 shows a scoresheet.

The scoresheet is made up of entries describing the "IDs", "phoneme series", "cluster numbers", "representative member IDs", and "scores" of unregistered words.

The same things as stored in the characteristic vector buffer 77 are registered as the "ID" and "phoneme series" of an unregistered word by the clustering section 78. The "cluster number" is a number specifying a cluster of which an unregistered word of that entry is a member, and that number is designated by the clustering section 78 and registered in the scoresheet. The "representative member ID" is the ID of an unregistered word as the representative member representing a cluster of which the unregistered word of that entry is a member, and it is this representative member ID that makes it possible to recognize the representative member of a cluster of which the unregistered word is a member. The representative member of a cluster is obtained by the clustering section 29, and the ID of the representative member is registered to the representative member ID on the scoresheet. The "score" is a score of each of the other unregistered words in respect to the unregistered words on this entry, and calculated by the clustering section 78 as described above.

Now, assuming, for example, that the IDs, phoneme series, and characteristic vector series of N pieces of unregistered words are stored in the characteristic vector buffer 77, registered onto the scoresheet are the IDs, the phoneme series, the cluster numbers, the representative IDs, and the scores of the N pieces of the unregistered words.

And, when the IDs, phoneme series, and the characteristic vector series of new unregistered words are newly stored in the characteristic vector buffer 77, the scoresheet is updated in the clustering section 78 as shown by the broken line in FIG. 19.

That is, added to the scoresheet are the ID, a phoneme series, a cluster number, and a representative member ID of a new unregistered word, and a score of each of the already-stored unregistered words in respect to the new unregistered word (scores s (N+1, 1), s (2, N+1), . . . s (N+1, N) in FIG. 19). Furthermore, added to the scoresheet are a score of a new unregistered word in respect to each of the already-stored unregistered words (scores s (N+1, 1), s (2, N+1), . . . s (N+1, N) in FIG. 19). Still furthermore, as described later, alteration is made, if needed, to the cluster numbers and the representative member IDs of the unregistered words on the scoresheet.

In this embodiment in FIG. 19, the score of (the speech of) an unregistered word with the ID i in respect to (the phoneme series of) an unregistered word with the ID j is expressed as s (i, j).

Also registered to the scoresheet (FIG. 19) is the score s (i, j) of (the speech of) an unregistered word with the ID i in respect to (the phoneme series of) an unregistered word with the ID j. Because this score s (i, j) is calculated in the matching section 72 when the phoneme series of an unregistered word is detected, it is not necessary to make calculations in the clustering section 78.

Again returning to FIG. 15, a maintenance section 80 updates the word dictionary stored in the dictionary storage section 74 based on the scoresheet updated in the scoresheet storage section 79.

Now, the representative member of a cluster is determined in the following way. That is, for example, what is to be the representative member of the cluster out of the unregistered words being members of the cluster is an unregistered word that makes the greatest the sum total of the scores of the rest of the other unregistered words (Other alternatives may include the average value produced by dividing the sum total divided by the number of the rest of other unregistered words, for example.). Therefore, in this case, assuming that the member ID of a member belonging to the cluster is expressed as k, the representative member is to be a member having a value k ($\in$k) as the ID, expressed in the following expression:

$$K = \max_k \{\Sigma s(k^3, k)\} \quad (1)$$

Note that in the above expression (1), the $\max_k \{\}$ means k that makes the value inside $\{\}$ the greatest. Also, the $k^3$ means, as the k does, the ID of a member belonging to the cluster. Furthermore, the means the sum total produced by varying the $k^3$ over all the IDs of the members belonging to the cluster.

In case of determining the representative member in the above manner, it, is not necessary to calculate the score in determining the representative member when the members of the cluster are of one or two unregistered words. That is to say, when a member of the cluster is a single unregistered word, that single unregistered word is to be the representative member, and when members of the cluster are two unregistered words, either of those two unregistered words may be designated as the representative member.

By no means is a method to determine the representative member limited to the aforementioned one, but it is also possible to designate as the representative member of the cluster, for example, an unregistered word picked up from among the members of the cluster that makes the least the sum total of the distance in the characteristic vector space in respect with each of the rest of other unregistered words.

Figure 20:
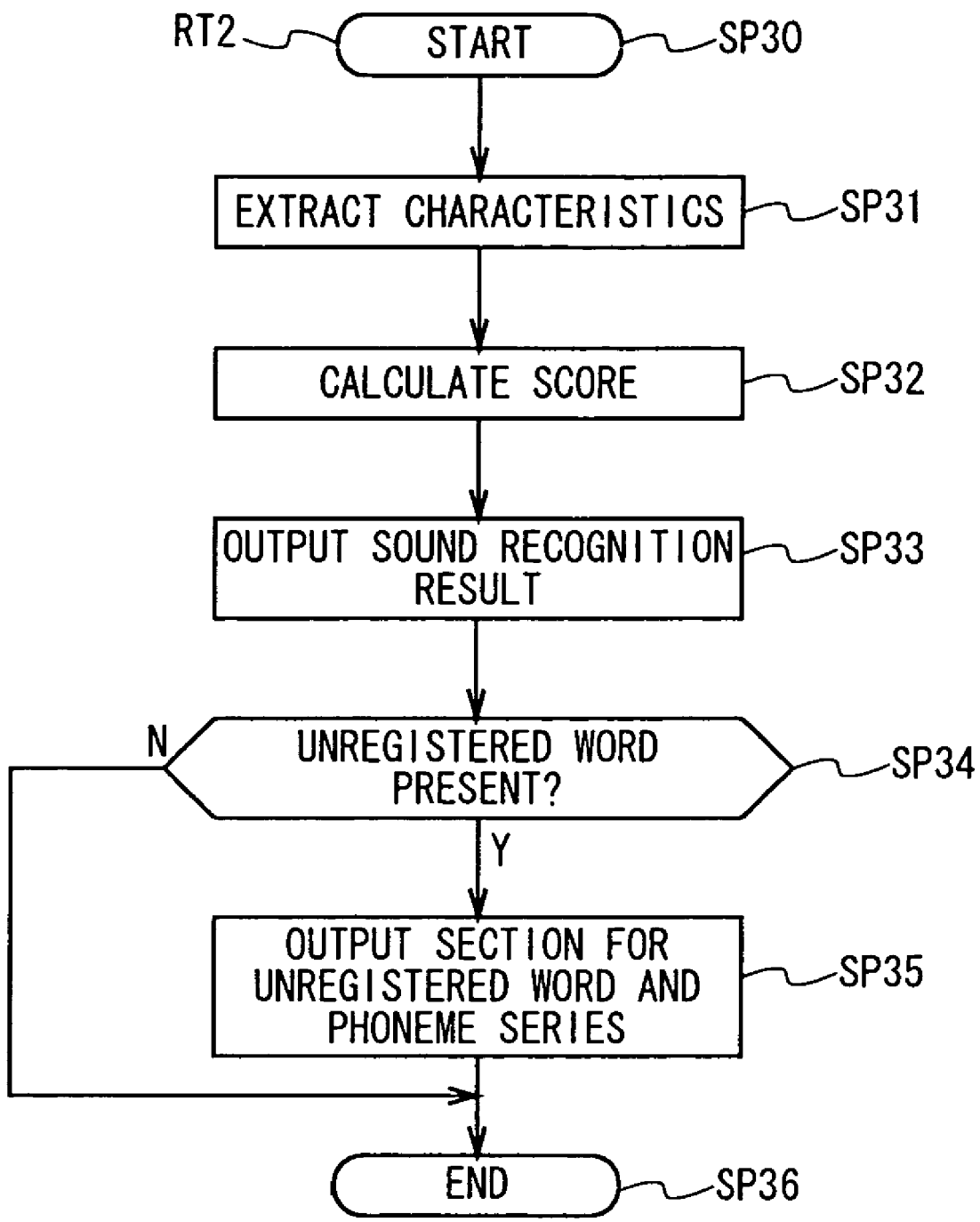
FIG. 20 is a flowchart showing a sound recognition processing routine.

In the sound recognition section 60 configured as described above, a sound recognition process to recognize a sound entered into the microphone 51 and an unregistered word process regarding unregistered words are performed according to the sound recognition processing routine RT2 shown in FIG. 20.

In practice, when an audio signal S1B obtained as a result of a person making speech is supplied from the microphone 51 to the characteristic extract section 71 as sound data through the AD converter 70, in the sound recognition section 60 this sound recognition processing routine RT2 is set in motion in step SP30.

And, in the following step SP31 the characteristic extract section 71 extracts a characteristic vector by acoustically analyzing the sound data with a predetermined frame unit, and the series of this characteristic vector is fed to the matching section 72 and the unregistered word section processing section 76.

In subsequent step S32 the matching section 76 performs the score calculation as described above as to the characteristic vector series given from the characteristic extract section 71, and in the following step S33 obtains and outputs the entry of a word row being the sound recognition result based on the score obtained as a result of the score calculation.

Furthermore, the matching section 72 judges in the following step S34 whether or not an unregistered word is included in the user's sound.

When it is judged in this step S34 that no unregistered word is included in the user's sound, that is, in the case that a sound recognition result is obtained without the aforementioned unregistered word regulation "$pat1=$color1 $garbage $color 2;" being applied, the processing proceeds to step S35, resulting in termination.

As against the above, in step S34, when it is judged that an unregistered word is included in the user's sound, that is, in the case that a sound recognition result is obtained with the unregistered word regulation "$pat1=$color1 $garbage $color 2;" being applied, in the subsequent step S35 the matching section 23 detects a sound section corresponding to the variable $garbage in the unregistered word regulation as the sound section of the unregistered word, and at the same time detects as the phonemic series of the unregistered word the phonemic series as the transition of a phoneme in a garbage model the variable $garbage represents, and the sound section and the phonemic series of the unregistered word are supplied to the unregistered word section processing section 76, terminating the processing (step SP36).

Meantime, storing the characteristic vector series supplied from the characteristic extract section 71 temporarily, when the sound section and the phonemic series of the unregistered word is supplied from the matching section 72, the unregistered word section processing section 76 detects the characteristic vector series of the sound in that sound section. Moreover, the unregistered word section processing section 76 affixes an ID to the (phonemic series of) unregistered word from the matching section 72, which is supplied to the characteristic vector buffer 77 along with the phonemic series of the unregistered word and the characteristic vector series in that sound section.

In the above manner, when the ID of the newly-found unregistered word (new unregistered word), phonemic series, and characteristic vector series are stored in the characteristic vector buffer 77, the processing of the unregistered word is set in motion subsequently according to the unregistered word processing routine RT3 shown in FIG. 21.

That is, in the sound recognition sector 60, as described above, when the ID, phonemic series, and characteristic vector series of the newly-found unregistered word (new unregistered word) are stored in the characteristic vector buffer 77, this unregistered word processing routine RT3 is set in motion in step SP40, first followed by step SP41, where the clustering section 78 reads the ID and phonemic series of the new unregistered word from the characteristic vector buffer 77.

In the following step S42, the clustering section 78 judges whether or not an already-obtained (-generated) cluster exists, by referring to the scoresheet in the scoresheet storage section 30.

And, when it is judged in this step S42 that an already-obtained cluster does not exist, that is, in the case where a new unregistered word is the first unregistered word, and where no entry of an already-stored unregistered word exist on the scoresheet, the processing goes on to step S43, where the clustering section 78 newly generates a cluster of which the new unregistered word is the representative member and updates the scoresheet by registering the information regarding the new cluster and the information regarding the new unregistered word to the scoresheet in the scoresheet storage section 79.

That is, the clustering section 78 registers the ID and phonemic series of the new unregistered word read from the characteristic vector buffer 77, to the scoresheet (FIG. 19). Moreover, the clustering section 78 generates a unique cluster number, which is registered to the scoresheet as the cluster number of the new unregistered word. Also, the clustering section 78 has the ID of the new unregistered word registered to the scoresheet as the representative number ID of the new unregistered word. In this case, therefore, the new unregistered word becomes the representative member of the new cluster.

Note that score calculation is not made in this instance because there is no already-stored unregistered word with which to perform score calculation in relation to the new unregistered word.

After the process in step S43, the processing goes to step S52, where the maintenance section 80 updates the word dictionary in the dictionary storage section 74 based on the scoresheet updated in step S43, and the processing terminates (step SP54).

That is, in this case, since a new cluster is generated, the maintenance section 31 recognizes the newly generated cluster, referring to the cluster number in the scoresheet. Then the maintenance section 80 adds an entry corresponding to the cluster to the word dictionary of the dictionary storage section 74, and registers as the phonemic series of the entry the phonemic series of the representative member of the new cluster, namely the phonemic series of the new unregistered word in this case.

On the other hand, when it is judged in step S42 that there exists an already-obtained cluster, that is, in the case where the new unregistered word not being the first unregistered word, there exists an entry (row) of an already-stored unregistered word in the scoresheet (FIG. 19), the processing proceeds to step S44, where the clustering section 78 calculates the score of each of already-stored unregistered words with respect to the new unregistered word, and at the same time calculates the score of the new unregistered word in respect to each of already-stored unregistered words.

In other words, now assuming, for example, that there exist already-stored unregistered words whose IDs run from 1 to N, with the ID of a new unregistered word being N+1, calculation is made in the clustering section 78 on the scores s (N+1, 1), s (N+1, 2) . . . , s (N, N+1) of each of N pieces of already-stored unregistered words in respect to the new unregistered word in the portion shown by the broken lines in FIG. 19 and on the scores s (1, N+1), s (2, N+1) . . . , s (N, N+1) of the new unregistered word in respect to each of N pieces of already-stored unregistered words. Note that in having those scores calculated in the clustering section 78 the characteristic vector series of the new unregistered word and each of the N pieces of already-stored unregistered words are required, however, those characteristic vector series are recognized by referring to the characteristic vector buffer 28.

Then the clustering section 78 adds the calculated scores to the scoresheet (FIG. 19) along with the IDs of the new unregistered words and phonemic series, and the processing proceeds to step S45.

In step S45, by referring to the scoresheet (FIG. 19) the clustering section 78 detects a cluster having the representative member that makes the highest (greatest) the scores s (N+1, i) (i=1, 2, . . . , N) in respect to the new unregistered word. That is to say, the clustering section 78 recognizes an already-stored unregistered word being the representative member by referring to the ID of the representative member on the scoresheet, and furthermore by referring to the scores on the scoresheet detects an already-stored unregistered word as the representative member that makes the score of the unregistered word the highest. And the clustering section 78 detects a cluster having the cluster number of an already-stored unregistered word as the detected representative member.

Subsequently the processing goes on to step S46, where the clustering section 29 adds the new unregistered word to the members of the clusters detected in step S45 (they are referred to as "detected clusters" wherever properly applicable hereinafter.). That is, the clustering section 78 writes the cluster number of the representative member of the detected clusters as the cluster number of the new unregistered word on the scoresheet.

In step S47 the clustering section 78 performs a cluster dividing process to divide the detected cluster into two, for example, and the processing proceeds to step S48. In step S48 the clustering section 78 judges whether or not the detected cluster has been successfully divided into two with the clustering dividing process in step S47, and when the dividing is judged successful, the processing goes on to step S49. In step S49 the clustering section 78 calculates the cluster distance between the two clusters produced by dividing the detected cluster (These two clusters are referred to as the "first sub-cluster and second sub-cluster" wherever properly applicable hereinafter.).

Here, the cluster distance between the first sub-cluster and second sub-cluster is defined as follows, for example.

Assuming that the ID of an arbitrary member (an unregistered word) of both the first sub-cluster and the second sub-cluster is represented by K, and either of the representative members (unregistered words) of the first sub-cluster and the second sub-cluster by k1 or k2, in the following expression:

$$D(k1, k2) = \text{maxval}_k \{\text{abs}(\log(s(k,k1)) - \log(s(k,k2)))\} \quad (2)$$

the value D (k1, k2) is defined as the inter-cluster distance between the first sub-cluster and the second sub-cluster.

Note that in the Expression 2 the abs ( ) denotes the absolute value of a value in the ( ). Also, the maxval$_k$ { } indicates the maximum value of a value in the { } that can be obtained by varying k. And, the log expresses the natural logarithm, or the common logarithm.

Now, assuming that the ID represents a member i as the member #1, the reciprocal 1/s (k, k1) of the score in Expression (2) corresponds to the distance between the member #k and the representative member K1, and the reciprocal 1/s (k, k2) of the score in Expression (2) the distance between the member #k and the representative member K2. According to Expression (2), therefore, the maximum value of a difference between a distance between the representative member #k1 and any member of the first sub-cluster and a distance between the representative member #k2 and any member of the second sub-cluster is to be an inter-cluster distance between the first and second sub-clusters.

The inter-cluster distance is not limited to what is described above, and it also is possible to designate as the inter-cluster distance the summated value of the distance in the characteristic vector space obtained by DP-matching the representative member of the first sub-cluster and the representative member of the second sub-cluster, for example.

After the process in step S49, the processing proceeds to step S50, where the clustering section 78 judges whether or not the inter-cluster distance between the first and second sub-clusters is greater than a predetermined threshold value $\xi$ (or, the predetermined threshold value $\xi$ or higher).

When it is judged in step S50 that the inter-cluster distance is greater than the predetermined threshold value, that is, in the case where a plurality of unregistered words as members of the detected cluster are supposed to be clustered into two clusters in terms of the acoustic characteristic, the processing goes on to step S51, where the clustering section 78 registers the first and second sub-clusters to the scoresheet in the scoresheet storage section 79.

That is to say, with unique cluster numbers assigned to the first and second sub-clusters the clustering section 78 updates the scoresheet such that the cluster numbers of the members clustered into the first sub-cluster are designated as the cluster numbers of the first sub-cluster and the cluster numbers of the members clustered into the second sub-cluster as the cluster numbers of the second sub-cluster.

Furthermore, the clustering section 78 updates the scoresheet such that the representative member ID of the members clustered into the first sub-cluster is designated as the ID of the representative member of the first sub-cluster and the representative member ID of the members clustered into the second sub-cluster as the ID of the representative member of the second sub-cluster.

Note that it is possible to assign the cluster number of the detected cluster to either of the first and second sub-clusters.

When the first and second sub-clusters are registered to the scoresheet in the above manner by the clustering section 78, the processing moves from step S51 to S52, where the maintenance section 80 updates the word dictionary in the dictionary storage section 74 based on the scoresheet, then the processing terminates (step SP54).

That is, in this case, because the detected cluster is divided into the first and second sub-clusters, the maintenance section 80 first deletes the entries in the word dictionary corresponding to the detected cluster. Furthermore, the maintenance section 80 adds to the word dictionary the two entries corresponding to the first and second sub-clusters respectively, and registers the phonemic series of the representative member of the first sub-cluster as the phonemic series of the entry corresponding to the first sub-cluster, and at the same time the phonemic series of the representative member of the second sub-cluster as the phonemic series of the entry corresponding to the second sub-cluster.

On the other hand, when it is judged in step S48 that the cluster dividing process in step S47 could not divide the detected cluster into two clusters, or when it is judged in step S50 that the inter-cluster distance between the first and second sub-clusters is less than a predetermined threshold value $\xi$, (in other words, in the case where the acoustic characteristic of a plurality of unregistered words as the members of the detected cluster does not resemble the first and second sub-clusters to such an extent as to cause clustering.), the processing proceeds to step S53, where the clustering section 78 obtains a new representative member of the detected cluster, with which the scoresheet is updated.

That is, the clustering section 78 recognizes a score s ($k^3$, k) necessary for the calculation of Expression (1) by referring to the scoresheet in the scoresheet storage section 79 in respect to each member of the detected cluster to which the new unregistered words are added. Furthermore, the clustering section 78 obtains the ID of a member to be the new representative member of the detected cluster based on Expression (1) with the use of the recognized score s ($k^3$, k). Then the clustering section 78 overwrites the representative member ID of each member of the detected cluster in the scoresheet (FIG. 19) for the ID of the new representative member of the detected cluster.

Subsequently the processing goes on to step S52, where the maintenance section 80 updates the word dictionary in the dictionary storage section 74 based on the scoresheet, and the processing ends (step SP54).

In other words, in this case, the maintenance section 80 recognizes the new representative member of the detected cluster by referring to the scoresheet, and furthermore recognizes the phonemic series of the representative member. Then the maintenance section 80 alters the phonemic series of an entry corresponding to the detected cluster in the word dictionary to the phonemic series of the new representative member of the detected cluster.

Figure 21:
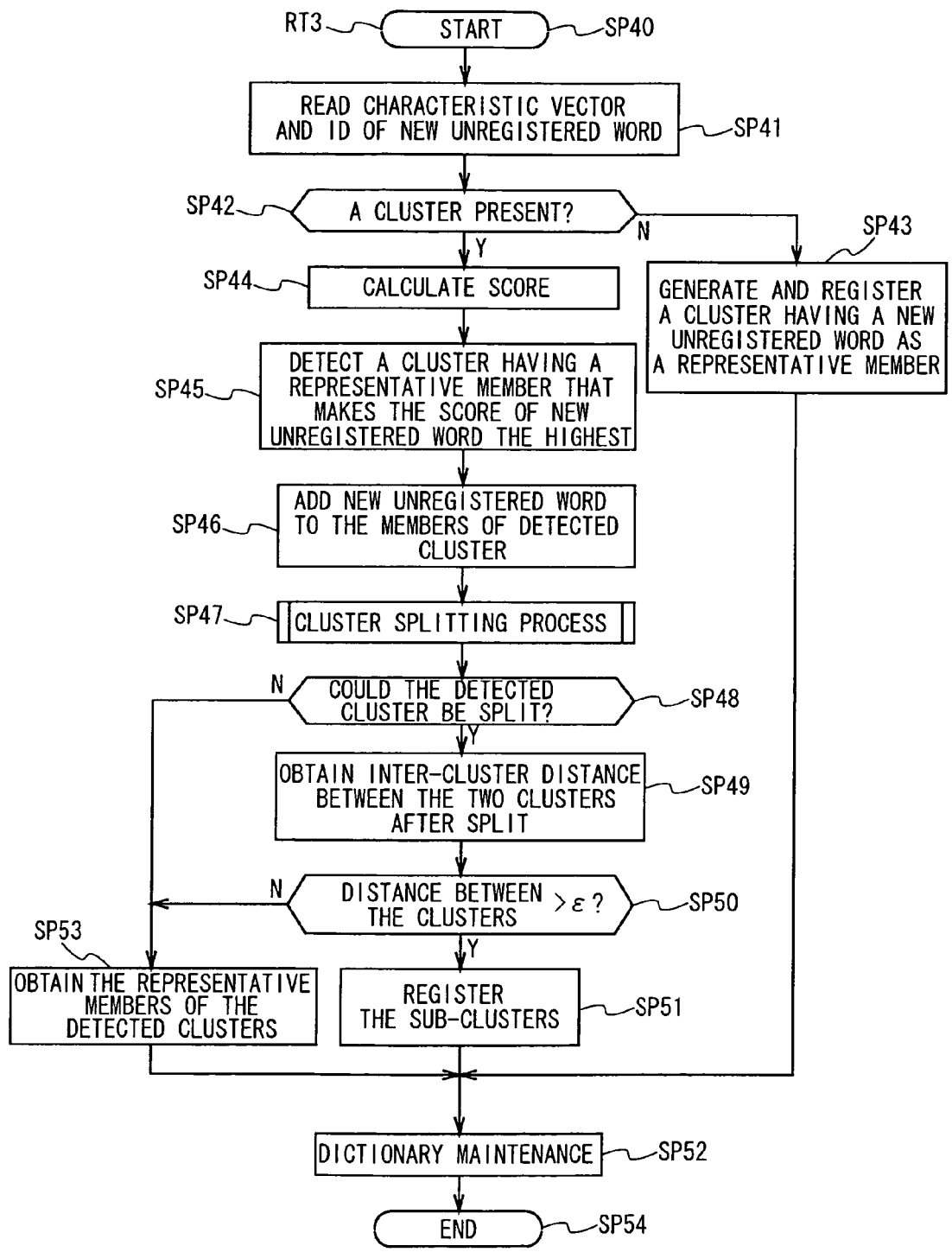
FIG. 21 is a flowchart showing an unregistered word processing routine.
Figure 22:
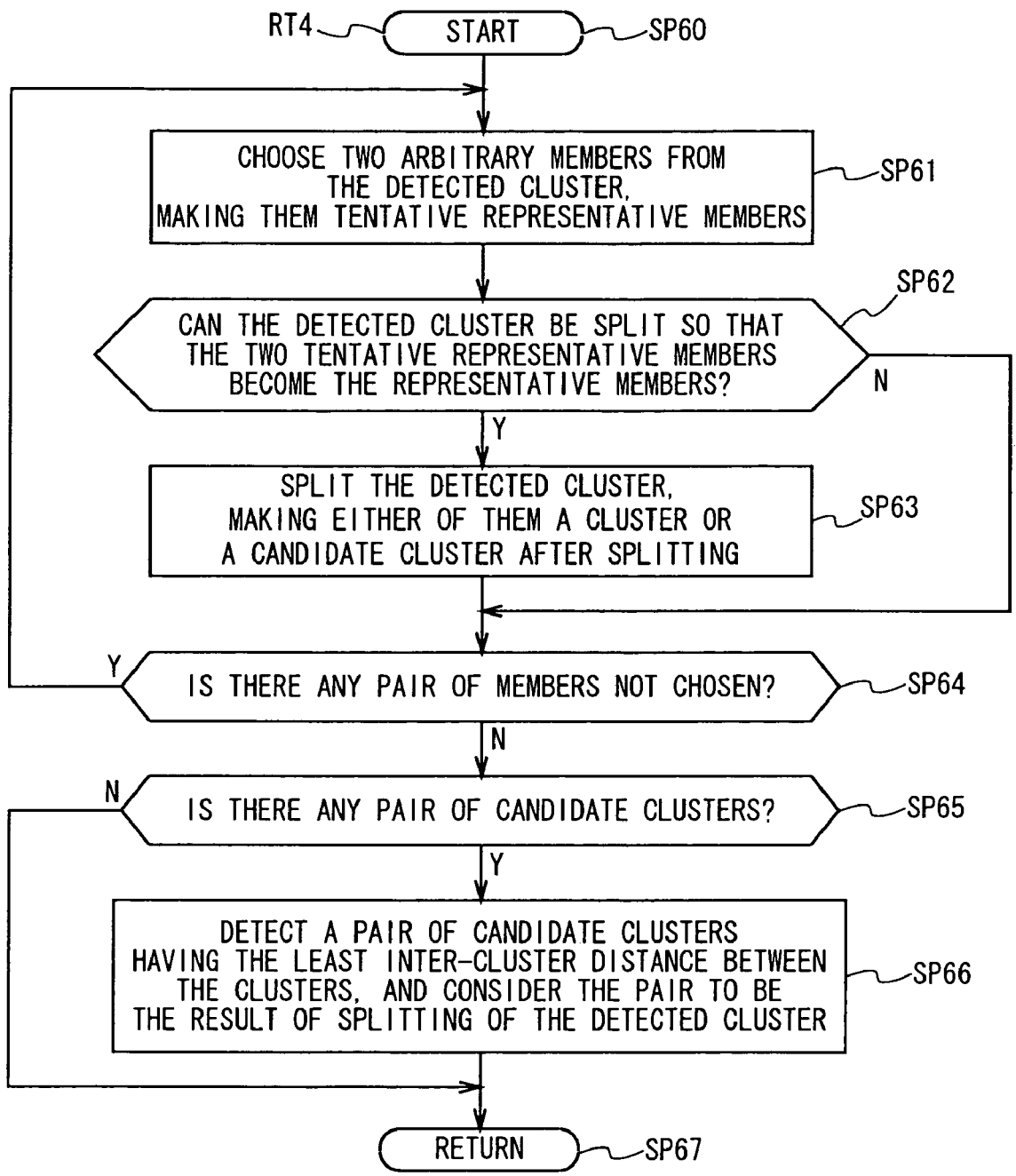
FIG. 22 is a flowchart showing a cluster-split processing routine.

Now, the cluster dividing process in step SP47 in FIG. 21 is performed in accordance with the cluster dividing process routine RT4 shown in FIG. 22.

That is, in the sound recognition processing section 60, with the processing advancing from step SP46 to step SP47 in FIG. 22 the cluster dividing process routine RT4 begins in step SP60, and firstly in step S61 the clustering section 78 chooses a combination of two arbitrary members to be chosen from the detected cluster to which the new unregistered words are added as members, each of which is to be a tentative representative member. Note here that these two tentative representative members are referred to as "the first tentative representative member" and "the second tentative representative member" wherever properly applicable hereinafter.

Then, in the following step S62 the clustering section 78 judges whether or not the member of the detected cluster can be divided into two clusters, so that the first tentative representative member and the second tentative representative member may be made to be the representative member respectively.

In this stage it is necessary to perform the calculation of Expression (1) to determine whether or not the first or the second tentative representative member can be made to be the representative member, and the score s (K', k) to be used for this calculation can be recognized by referring to the scoresheet.

When it is judged in step S62 that it is impossible to divide the member of the detected cluster into two clusters so that the first tentative representative member and the second tentative representative member may be made to be the representative member respectively, the processing goes to step S64, skipping step S62.

Meanwhile, when it is judged in step S62 that it is possible to divide the member of the detected cluster into two clusters so that the first tentative representative member and the second tentative representative member may be made to be the representative member respectively, the processing goes to step S63, then the clustering section 78 divides the member of the detected cluster into two clusters so that the first tentative representative member and the second tentative representative member may be made to be the representative member respectively, with a pair of the divided two clusters made to be candidates for the first and second sub-clusters as a result of dividing the detected cluster (They are referred to as "a pair of candidate clusters" wherever properly applicable hereinafter), and the processing moves on to step S64.

In step S64 the clustering section 78 judges whether or not there still is a pair of two members not chosen as a pair of the first and second tentative representative members in the members of the detected cluster, and when judged there is, the processing returns to step S61, where selection is made of a pair of two members of the detected cluster not yet chosen as a pair of the first and second tentative representative members, and similar processing is repeated afterwards.

Also, when it is judged in step S64 that there is no pair of two members of the detected cluster not yet selected as a pair of the first and second tentative representative members, the processing proceeds to step S65, where the clustering section 78 judges whether or not there is a pair of candidate clusters.

When it is judged in step S65 that there is no pair of candidate clusters, the processing returns, skipping step S66. In this case, it is judged in step S48 in FIG. 21 that the detected cluster could not be divided.

On the other hand, when it is judged in step S65 that there exists a pair of candidate clusters, the processing goes on to step S66, where the clustering section 78 obtains the inter-cluster distance between two clusters of each pair of candidate clusters when there are a plurality of pairs of candidate clusters. Then the clustering section 78 obtains a pair of candidate clusters of which inter-cluster distance is the least, and the pair of candidate clusters are divided to produce the first and second sub-clusters, and the processing returns. Note that in case there is the only pair of candidate clusters, they are made to be the first and second sub-cluster as they are.

In this case, it is judged in step S48 in FIG. 21 that the dividing of the detected cluster has been successfully performed.

As above, because in the clustering section 78 a cluster (a detected cluster) to which a new unregistered word is added as a new member is detected out of clusters on which the clustering of an already-obtained unregistered word is performed, and with the new unregistered word as a new member of the detected cluster the detected cluster is divided based on the members of the detected cluster, it is easy to cluster the unregistered word into those (clusters) of which acoustic characteristics are closely analogous to each other.

Moreover, since the word dictionary is to be updated based on the results of such clustering in the maintenance section 80, it is easy to perform registering an unregistered word to the word dictionary preventing it from getting large-sized.

Also, for example, if the sound section of an unregistered word is detected wrongly in the matching section 72, such unregistered word is clustered into another cluster separately from an unregistered word of which sound section is correctly detected by dividing the detected cluster. Then an entry corresponding to such a cluster is to be registered to the word dictionary, however, since the phonemic series of this entry corresponds to the sound section not correctly detected, it never happens that a large score is given in future sound recognition. Therefore, should the sound section of an unregistered word is detected wrongly, for example, that error gives almost no influence to future sound recognition.

Now, FIG. 23 shows the result of clustering obtained by uttering an unregistered word. Note that each entry (each row) in FIG. 23 shows one cluster. Also, the left column of FIG. 23 shows the phonemic series of the representative member (an unregistered word) of each cluster, and the right column of FIG. 23 the contents and the number of unregistered words being members of each cluster.

That is, in FIG. 23 the entry on the first row, for example, indicates a cluster of which member is the only utterance of an unregistered word "furo (bath)", and that the phonemic series of that representative member is "doroa:". Also, the entry on the second row, for example, indicates a cluster of which members are three utterances of an unregistered word "furo", and the phonemic series of that representative member is "kuro".

Furthermore, the entry on the 7th row, for example, indicates a cluster of which members are four utterances of an unregistered word "hon (book)", and that the phonemic series of that representative member is "NhoNde : su" (ンホンテース). Also the entry on the 8th row, for example, indicates a cluster of which members are one utterance of an unregistered word "orenji (orange)" and nineteen (19) utterances of an unregistered word "hon (book)", and that the phonemic series of that representative member is "ohoN" (オホン). The other entries indicate similar things.

According to FIG. 23, it can be seen that clustering is performed properly as to the utterance of the same unregistered word.

As to the entry on the 8th row in FIG. 23, one utterance of an unregistered word "orenji (orange)" and nineteen (19) utterances of an unregistered word "hon (book)" are clustered into the same cluster. It is supposed in light of the utterance being. a member of the cluster that this cluster should be the cluster of the unregistered word "hon", however, the utterance of the unregistered word "orenji", too, is a member of that cluster. As the utterance of the unregistered word "hon" is kept being entered further, this cluster is also divided by clustering, leading to an idea that clustering may be performed in such a way as to produce a cluster of which member is the utterance of the unregistered word "hon" only and a cluster of which member is the utterance of the unregistered word "orenji" only.

(4-2) Concrete Configuration of Face Recognition Section 62

Next, explanation is given on the concrete configuration of the face recognition section 62.

Figure 24:
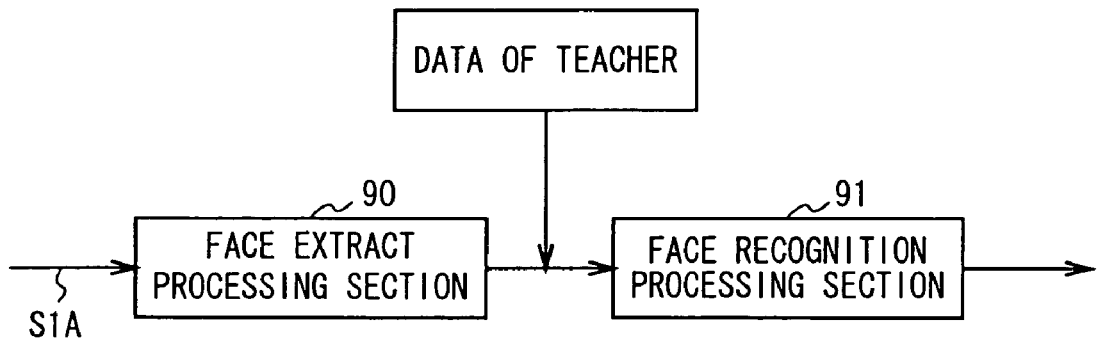
FIG. 24 is a block diagram showing the structure of a face recognition section in learning.
Figure 25:
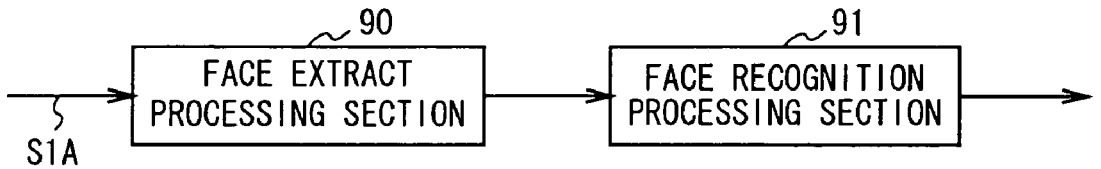
FIG. 25 is a block diagram showing the structure of a face recognition section in recognizing.

As shown in FIGS. 24 and 25, being capable of responding within a predetermined period of time under a dynamically varying environment, the face recognition section 62 comprises a face extract processing section 90 to extract a face pattern out of an image based on a video signal S1A supplied from the CCD camera (FIG. 5) and a face recognition processing section 91 to recognize a face based on the extracted face pattern. In this embodiment the "Gabor filtering" is used for face extract processing to extract a face pattern, and the "support vector machine: SVM" for face recognition processing to recognize a face out of the face pattern.

This face recognition section 62 is provided with a learning stage where the face recognition processing section 91 learns a face pattern and a recognition stage to recognize a face pattern extracted from the video signal S1A based on the learned data.

FIG. 24 shows the configuration of the learning stage of the face recognition section 62, and FIG. 25 the configuration of the recognition stage of the face recognition section 62 respectively.

As shown in FIG. 24, at the learning stage the result of a face extracted out of captured user images entered from the CCD camera (FIG. 5) in the face extract processing section 90 composed of Gabor filters is entered into the face recognition processing section 91 composed of a support vector machine. In the face recognition processing section 91 a temporary discriminant function is obtained with the use of data for learning supplied from the outside, namely teacher data.

Also, as shown in FIG. 25, at the discriminating stage the result of a face-extraction in the face extract processing section 90 out of the face of a person within an image based on the video signal S1A supplied from the CCD camera 50, is entered into the face recognition processing section 91. In the face recognition processing section 91 a face is detected by testing the temporary obtained discriminant function with images on a variety of database. Then, what is successfully detected is outputted as face data. Meanwhile, what failed in detecting is added to learning data as non-face data, and further learning is performed.

Detailed explanation is given below on the Gabor filtering process in the face extract processing section 90 and the support vector machine in the face recognition processing section 91.

(4-2-1) Gabor Filtering Process

It is already known that in the visual cells of a human being there exist cells having selectivity toward a certain specific direction. Those selective cells consist of cells responsive to a vertical line and cells responsive to a horizontal line. As in the case with this, the Gabor filtering is a spatial filter composed of a plurality of filters having direction selectivity.

The Gabor filtering is spatially expressed with Gabor functions. A Gabor function g (x, y) is, as shown in the following expression, made up of a carrier s (x, y) composed of a cosine component and a two-dimensional gauss analytical envelope $W_r$ (x, y).

$$g(x,y)=s(x,y)w_r(x,y) \quad (3)$$

The carrier s (x, y) is expressed as in the following expression (4) with the use of a plurality of functions. Here, the coordinate value $(u_0, v_0)$ indicates a spatial frequency, and the P the phase of the cosine component.

Here, the carrier shown in the following expression, $$s(x,y)=\exp(j(2\pi(u_0 x+v_0 y)+P)) \quad (4)$$

is, as shown in the following expression, $$Re(s(x,y))=\cos(2\pi(u_0 x+v_0 y)+P$$

$$Im(s(x,y))=\sin(2\pi(u_0 x+v_0 y)+P \quad (5)$$

can be separated into a real number component Re (s (x, y) and an imaginary number component Im (s (x, y).

On the other hand, using the following expression the envelope composed of the two-dimensional gauss distribution can be expressed as under:

$$W_r(x,y)=K \exp(-\pi(a^2(x-x_0)_r^2+b^2(y-y_0)_r^2)) \quad (6)$$

Here, the coordinate axis $(x_0, y_0)$ is the peak of the function, the constants a and b the scale parameters of the gauss distribution. Also, as shown in the following expression, the subscript $_r$ denotes rotating operation.

$$(x-x_0)_r=(x-x_0)\cos\theta+(y-y_0)\sin\theta$$

$$(y-y_0)_r=-(x-x_0)\sin\theta+(y-y_0)\cos\theta \quad (7)$$

Therefore, according to the aforementioned expressions (4) and (6), the Gabor filter can be expressed as the spatial functions as shown in the following expression:

$$g(x,y)=K \exp(-\pi(a^2(x-x_0)_r^2+b^2(y-y_0)_r^2))$$

$$\exp(j(2\pi(u_0 x+u_0 y)+P)) \quad (8)$$

The face extract processing section 90 in this embodiment performs the face extract process using a total of twenty-four (24) Gabor filters with the use of eight (8) kinds of directions and three (3) kinds of frequencies.

The response of Gabor filter is represented in the following expression, where $G_i$ is the i-th Gabor filter, the result (Gabor Jet) of the i-th Gabor $J_i$, and an input image I:

$$J_i(x,y)=G_i(x,y)\oplus I(x,y) \quad (9)$$

In practice the operation of the expression (9) can be speeded up with the use of high-speed fourier transformation.

The performance of the manufactured Gabor filter can be examined by reconfiguring the pixels obtained as a result of filtering. The following expression:

$$H(x, y) = \sum_{i=1}^{0} a_i J_i(x, y) \quad (10)$$

shows the reconfigured image H.

And, an error E occurring between the input image I and the reconfigured image H is expressed in the following expression:

$$E = \frac{1}{2}\|I(x, y) - H(x, y)\|^2 = \frac{1}{2}\sum_{x,y} (I(x, y) - H(x, y))^2 \quad (11)$$

The reconfiguration can be available by obtaining the most appropriate a that may make this error E the least.

(4-2-2) Support Vector Machine

In this embodiment, as to face recognition in the face recognition processing section 91, face recognition is performed with the use of a support vector machine (SVM) of which the universal learning performance is said to be the highest in the field of pattern recognition.

As for the SVM itself, reference can be made to the reports by B. Sholkoph et al, for example. (B. Sholkoph, C. Burges, A. Smola, "Advance in Kernel Support Vector Learning", The MIT Press, 1999). According to the results of preliminary experiments carried out by the applicant of the present invention, it has become clear that the face recognition method with the use of SVM shows better results, compared to techniques using principal component analysis (PCA) and neural networks.

Being a learning machine using a linear discrimination circuit (perceptron), SVM can be expanded to nonlinear space by using kernel functions. Also, the learning of discriminant functions is performed in a way to take the maximum margin of separation among classes, thereby making it possible to obtain the solution by solving two-dimensional mathematical programming, which theoretically ensures the attainment of the global solution.

Ordinarily the problem of pattern recognition is to obtain a discriminant function f (x) given in the following expression relative to test sample x=(x1, x2 . . . , xn):

$$f(x) = \sum_{j=1}^{n} w_j x_j + b \quad (12)$$

Here, the teacher label for SVM learning is established as in the following expression:

$$y=(y1, y2 \ldots, yn) \quad (13)$$

Then, the recognition of a face pattern with SVM can be captured as a problem to minimize the square of the weight factor w under the restricting condition shown in the following expression:

$$y_1(w^T x_i + b) z 1 \quad (14)$$

Such a problem having restrictions can be solved with the use of Lagrangian undefined constant method. That is, first introducing a Lagrangian (function) into the following expression:

$$L(w, b, a) = \frac{1}{2}\|w\|^2 - \sum_{i=1}^{l} a_i(y_i((x_i^T w + b) - 1)) \quad (15)$$

Subsequently, as shown in the following expression:

$$\frac{\partial L}{\partial b} = \frac{\partial L}{\partial w} = 0 \quad (16)$$

partial differentiation should be performed on each of b and w.

As a result, the discrimination of a face pattern in SVM can be captured as a secondary plan problem shown in the following expression:

max Σai−1Σaiaiyiyi$i^r$xj restrictive condition: $ai \geq 0$, Σaiyi=0 (17)

When the number of dimensions of characteristic space is smaller than the number of training samples, with the introduction of a scratch variable $\xi \geq 0$ the restrictive condition should be altered as in the following expression:

$$y_i(w^T x_i + b) \geq 1 - \xi_i \quad (18)$$

As to optimization, in the following expression:

$$\frac{1}{2}\|w\|^2 + C\Sigma \xi_i \quad (19)$$

the objective function is minimized.

In this expression (19), C is a coefficient with which to specify to what extent the restrictive condition should be loosened, and this value must be determined experimentally.

The problem regarding Lagranrian constant a is altered to the following expression:

$$\max \ \Sigma ai - \frac{1}{2}\Sigma aiyiyi^T xj \quad (20)$$

Restrictive condition: $0 \leq ai \leq c$, Σaiyi = 0

With this Expression (20) as is, however, it is impossible to solve the nonlinear problem. Such being the case, in this embodiment, with the introduction of a kernel function K (x, $x^3$) it is once mapped in a high-dimensional space (kernel trick), which is to be linearly separated. Therefore, it is tantamount to being nonlinearly separated in the original space.

The kernel function is expressed as in the following expression with the use of a certain map Φ.

$$K(x, y) = \Phi(x)^T \Phi(x^1) \quad (21)$$

Also, the discriminant function shown in Expression (12) can be expressed as in the following expression:

$$f(\Phi(x)) = w^T \Phi(x) + b \quad (22)$$
$$= \Sigma aiyi K(x, xi) + b$$

Also, learning, too, can be captured as a secondary plan problem shown in the following expression:

$$\max \ \Sigma ai - \frac{1}{2}\Sigma aiaiyiyixjK(Xi, xj) \quad (23)$$

Restrictive condition: $0 \leq ai \leq c$, Σaiyi = 0

As a kernel, a gaussian kernel (RBF (Radius Basic Function)) etc., as shown in the following expression, can be used.

$$K(x, x^1) = \exp\left[-\frac{|x-x^1|}{\sigma^2}\right] \quad (24)$$

As for Gabor filtering, the type of a filter may be changed according to a recognition task.

It is redundant that all the images after filtering are endowed with a vector in a low-frequency filtering. So the dimension of a vector may be lowered by down-sampling. The twenty-four (24) kinds of vectors down sampled is made to be a long vector formed in a line.

Also, in this embodiment, since the SVM applied to the recognition of face patterns is a discriminator that divides a characteristic space into two, learning is performed in such a manner as to judge whether a face under examination is "person A", or is "not person A". Therefore, first the face images of the person A are gathered up out of the images in the database, and then a label of "not person A" is affixed to the vector after Gabor filtering. Generally it is better that the number of face images gathered up is greater than the dimensions of the characteristic space. Likewise, in need of recognizing the faces of ten (10) persons, one discriminator is arranged for each person in a manner of "person B", "not person B", etc.

Such learning contributes to finding a support vector that makes separation between "person A" and "not person A", for example. Being a discriminator that divides the characteristic space into two, the SVM, when a new face image is entered, produces an output of recognition results depending upon on which side of the interface surface constituting the obtained support vector the vector of the Gabor filtering exists. Therefore, when it is in the region of "person A" in respect to the boundary, it is recognized as "person A". Likewise, when it is in the "not person A" region, it is recognized as "not person A".

A region as a face portion cut out from images based on the video signal S1A from the CCD camera 50 is not fixed. So it is possible that the face may be projected at a point away from the category desired to be recognized in the characteristic space. Accordingly it is possible to enhance the recognition rate by inferring parts having characteristics of the eyes, noise, and mouth and by morphying them by means of affine transformation.

Also it is possible to use bootstrapping to enhance the recognition capability. Another image photographed separately from the images to be used for learning is used for bootstrapping. This means that when the discriminator which performed learning produces an output of wrong recognition results, learning is performed again by entering the input image into the learning set.

Another method to enhance the recognition performance is to observe time varying of recognition results. The simplest method may be to recognize "person A" when the "person A" is recognized eight times out of ten, for example. Other predicting methods have been proposed, such as one with the use of Kalman filters.

(5) Operations and Effects of Present Embodiment

According to the above configuration, this robot 1 obtains the name of a new person through dialog with that new person and stores the name in association with the data of the acoustic characteristics of the voice and the morphological characteristics of the face of that person detected based on the output from the microphone 51 and the CCD camera 50, and at the same time learns the name of a person based on the various pieces of stored data stored by recognizing the entrance of another new person whose name is yet to be obtained, and by obtaining and storing the name, the acoustic characteristics of the voice and the morphological characteristics of the face of the new person in much the same manner as described above.

Therefore, this robot 1 can learn the names of new persons and objects, etc. naturally through dialog with ordinary persons just as human beings do usually, with no need of name registration with clear indications from a user by means of entering sound commands and pushing of touch sensors, etc.

According to the above configuration, it is possible to obtain the name of a new person through dialog with that new person and to store the name in association with the data of the acoustic characteristics of the voice and the morphological characteristics of the face of that person detected based on the output from the microphone 51 and the CCD camera 50, and at the same time, to learn the name of a person based on various pieces of stored data by recognizing the entrance of another new person whose name is yet to be obtained, and by obtaining and storing the name, the acoustic characteristics of the voice and the morphological characteristics of the face of the new person in much the same manner as described above, resulting in successful learning of the names of persons, which makes it possible to realize robots that can learn the names of new persons and objects, etc. naturally through dialog with ordinary persons, thereby enhancing their entertainment property markedly.

(6) Modes of Other Embodiments

In the above embodiment, explanation is given on the case wherein the present invention is applied to the two-footed walking robot 1 constructed as in FIG. 1, but the present invention is not limited to it, and may be widely applied to various kinds of other robot apparatus and non-robotic equipment.

Also, in the above embodiment, explanation is given on the case wherein the name of a person may be obtained through sound dialog with that person by dialog means having a function of dialoguing with a human being and for obtaining the name of an object under study from the human being through the dialog, the dialog means comprising the sound recognition section 60, the dialog control section 63, and the audio synthesizer 64, but the present invention is not limited to this, and dialog means may be constructed such that the name of a person may be obtained through character dialog by means of keyboard inputting, for example.

Furthermore, in the above embodiment, explanation is given on the case wherein an object for name-learning is a human being, but the present invention is not limited to it, and a variety of other things may be considered as objects for name-learning, in place of, and in addition to a human being.

In this case of carrying out the above embodiment, explanation is given on the case wherein a person is recognized by the acoustic characteristics of the voice and the morphological characteristics of the face of that person under study, and based on the results of which it is judged whether or not that person is a new one, but the present invention is not limited to this, and in place of, and in addition to this, that person may be recognized by a plurality of other kinds of characteristics including body types and smells, for example, that may make it possible to recognize a biological solid body, and based on the results of which it may be judged whether or not that person is a new one. Also, in the case of an object under study for name-learning being a solid body other than a human being, it may be possible to judge whether or not that object is a new one based on results to be obtained as a result of recognizing that body from plural kinds of characteristics, such as colors, shapes, patterns, and size, etc., that may make it possible to distinguish it from other things. And, in such a case, a plurality of recognition means may be provided that detect different and specific characteristics of each object, and that recognize an object under study based on the detection results and the characteristic data corresponding to the known objects stored beforehand.

Furthermore, in the above embodiment, explanation is given on the case wherein memory constitutes storage means for storing associative information relating the names of the known objects and recognition results for the objects obtained by each of the recognition means (speaker recognition section 61 and face recognition section 62), but the present invention is not limited to this, and a variety of storage means other than memory may be widely employed to store information, such as disc-shaped recording media that can store information.

Still furthermore, in the above embodiment, explanation is given on the case wherein the speaker recognition section 61 and the face recognition section 62 perform recognition processes for recognizing a person under study one time only, but the present invention is not limited to it, and in the case of recognition being impossible (SID=−1), for example, the recognition processes may be performed one more time, and in other cases, too, the recognition processes may be performed plural times. The accuracy of recognition results may be improved by such performance.

Yet furthermore, in the above embodiment, explanation is given on the case wherein the dialog control section 63 judges whether or not a person under study is a new one by the decision of a majority of recognition results produced by the plurality of recognition means (sound recognition section 60, speaker recognition section 61, and face recognition section 62), but the present invention is not limited to it, and judgment on whether or not that person is a new person may be made based on each recognition result produced by a plurality of recognition means with the use of any method other than the decision of a majority.

In this case, a wide variety of methods may be applied, such as a method, wherein weight is added to each recognition result of a plurality of recognition means in accordance with the recognition capability of each of the recognition means, and based on each of weighted results it may be judged whether or not a target object is a new one, and when it is judged that that is a new person based on recognition results produced by one recognition means of the highest recognition capability and another recognition means, various other methods may be applied, wherein recognition results produced by other recognition means may not be utilized.

Furthermore, in the above embodiment, explanation is given on the case wherein, when the speaker recognition section 61 and the face recognition section 62 can recognize a person correctly, an attempt is made to enhance the recognition accuracy due to statistical stability by letting the speaker recognition section 61 and the face recognition section 62 perform addition-learning, but the present invention is not limited to this, and likewise, as for associative information to be stored in the memory 65, too, a function may be incorporated that may improve the reliability of the associative information by letting them learn the same combination any number of times. In practice, a method with the use of neural nets may be utilized as an exemplary method of those functions, which is described in the "Theses of the Academic Society for Electronic Information and Communication D-II, Vol. J82-DII, No. 6, pp. 1072-1081".

According to the present invention as above, learning equipment comprises: dialog means, having a capability of dialoging with a human being, for obtaining the name of a target object from the human being through the dialog; a plurality of recognition means, each of them for detecting prescribed separate characteristics of the target object, and simultaneously for recognizing the target object based on the detection result and the data of the characteristics corresponding to the known object stored beforehand; storage means for storing associative information wherein the name of the known object and recognition results on the object obtained by each of the recognition means are associated with each other; judgment means for judging whether or not the target object is the new object based on the name of the target object obtained by the dialog means, recognition results on the target object obtained by each of the recognition means, and the associative information stored in the storage means; and control means for letting each of the recognition means store the data of the characteristics corresponding to the target object when the judgment means judges the target object to be the new object, and simultaneously for letting the storage means store the associative information on the target object, whereby it is made possible to realize learning equipment that can learn the names of new persons and objects, etc. naturally through dialog with ordinary persons as human beings do usually, which may enhance its entertainment property markedly.

Also, according to the present invention, the learning method comprises: the 1st step of dialoging with a human being and obtaining the name of a target object from the human being through the dialog, and of detecting a plurality of prescribed separate characteristics of the target object and simultaneously recognizing the target object based on the detection result and the data of the characteristics of the known object stored beforehand; the 3rd step of judging whether or not the target object is the new object based on the name of the target object obtained, recognition results based on each of the characteristics of the target object, and the associative information wherein the name of the known object stored beforehand and the recognition results on the object produced by each of the recognition means are associated with each other; and the 4th step of storing the data of each of the characteristics of the target object and the associative information on the target object when the target object is judged to be the new object, whereby it is made possible to realize learning methods that can learn the names of new persons and objects, etc. naturally through dialog with ordinary persons as human beings do usually, which may enhance its entertainment property markedly.

Furthermore, according to the present invention, a robot apparatus comprises: dialog means, having a capability of dialoging with a human being, for obtaining the name of a target object from the human being through the dialog; a plurality of recognition means, each of them for detecting prescribed separate characteristics of the target object, and simultaneously for recognizing the target object based on the detection result and the data of the characteristics corresponding to the known object stored beforehand; storage means for storing associative information wherein the name of the known object and recognition results on the object obtained by each of the recognition means are associated with each other; judgment means for judging whether or not the target object is the new object based on the name of the target object obtained by the dialog means, recognition results on the target object obtained by each of the recognition means, and the associative information stored in the storage means; and control means for letting each of the recognition means store the data of the characteristics corresponding to the target object when the judgment means judges the target object to be the new object, and simultaneously for letting the storage means store the associative information on the target object, whereby it is made possible to realize a robot apparatus that can learn the names of new persons and objects, etc. naturally through dialog with ordinary persons as human beings do usually, which may enhance its entertainment property markedly.

Industrial Utilization

This invention is applied to various robots such as an entertainment robot, a personal computer, a security system and so on.

DESCRIPTION OF REFERENCE NUMERALS

1 - - - ROBOT; 40 MAIN CONTROL SECTION; 50 - - - CCD CAMERA; 51 - - - MICROPHONE; 54 - - - LOUDSPEAKER; 60 - - - SOUND RECOGNITION SECTION; 61 - - - SPEAKER RECOGNITION SECTION; 62 - - - FACE RECOGNITION SECTION; 63 - - - DIALOG CONTROL SECTION; 64 - - - AUDIO SYNTHESIZER; 65 - - - MEMORY; S1A - - - VIDEO SIGNAL; S1B, S3 - - - AUDIO SIGNAL; D1, D2 - - - CHARACTER STRING DATA; RT1 - - - NAME-LEARNING PROCESSING ROUTINE

The invention claimed is:

1. Learning equipment comprising:
   dialog means for obtaining a name of a target object through dialog;
   a plurality of recognition means for detecting a plurality of characteristic data of said target object, and for recognizing the target object based on a detection result and corresponding characteristic data of a known object;
   storage means for storing associative information relating recognition results of said recognition means for a name of said known object;
   judgment means for judging based on the name of said target object obtained by said dialog means, recognition results of said recognition means for said target object, and said associative information stored in said storage means, whether or not said target object is a new object, wherein the dialog means determines a content of the dialog with a user based on a face recognition result obtained by one of the plurality of recognition means, wherein when the recognition means recognizes a name of the user through a morphological characteristic of a face of the user, the dialog means obtains a confirmation of the recognized name from the user through dialog, wherein when the recognition means fails to recognize a name of the user through a morphological characteristic of a face of the user, the dialog means asks the user for the user's name through dialog, wherein the associative information relates the name to at least a sound identifier and a face identifier of the target object, and wherein when the name of said target object obtained by the dialog means is different than a name obtained by the recognition results, the judgment means determines that target object is a new object; and control means for storing said plurality of characteristic data on said target object in corresponding said recognition means and storing associative information on the target object in said storage means when said judgment means judges that said target object is a new object.

2. The learning equipment according to claim 1, wherein said control means controls said recognition means which recognized said target object correctly, to perform addition-learning when said judgment means judges that the target object is said known object.

3. The learning equipment according to claim 1, wherein said control means controls said recognition means which did not recognize said target object correctly, to perform correction-learning when said judgment means judges that the target object is said known object.

4. The learning equipment according to claim 1, wherein said judgment means judges by referring to said associative information stored in said storage means whether or not said target object is a new object, by a majority decision of the name of said target object obtained by said dialog means and recognition results of said recognition means for the object.

5. The learning equipment according to claim 1, wherein said control means controls said dialog means to protract said dialog according to necessity.

6. A computer-implemented learning method comprising:

a dialog step of obtaining a name of a target object through dialog;

a plurality of recognition steps of detecting a plurality of characteristic data of said target object and recognizing the target object based on detection result and corresponding characteristic data of a known object;

a storage step of storing associative information relating recognition results of said recognition steps for a name of said known object;

a judgment step of judging based on the name of said target object obtained by said dialog step, recognition results of said recognition step for the target object, and said associative information stored in said storage step, whether or not said target object is a new object;

an associating step of associating the name to at least a sound identifier and a face identifier of the target object, and, wherein the dialog step determines a content of the dialog with a user based on a face recognition result obtained by one of the plurality of recognition steps, wherein when the recognition step recognizes a name of the user through a morphological characteristic of a face of the user, the dialog steps obtains a confirmation of the recognized name from the user through dialog, wherein when the recognition step fails to recognize a name of the user through a morphological characteristic of a face of the user, the dialog step asks the user for the user's name through dialog, wherein when the name of said target object obtained by the dialog means is different than a name obtained by the recognition results, the judgment step determines that target object is a new object; and a control step of storing said plurality of characteristic data on said target object in corresponding said recognition step and storing associative information on the target object in said storage step when said judgment step judges that the target object is a new object.

7. The learning method according to claim 6, wherein, in said control step, when said target object is judged to be said known object, addition-learning is performed for said characteristics of the target object recognized correctly.

8. The learning method according to claim 6, wherein, in said control step, when said target object is judged to be said known object, correction-learning is performed for said characteristics of the target object not recognized correctly.

9. The learning method according to claim 6, wherein, in said judgment step, it is judged by referring to said associative information whether or not said target object is a new object, by a majority decision of the name of said target object and recognition results on said characteristics of the object.

10. The learning method according to claim 6, wherein, in said dialog step, the dialog is protracted according to necessity.

11. A robot apparatus comprising:

dialog means of obtaining a name of a target object through dialog;

a plurality of recognition means for detecting a plurality of characteristic data of said target object, and for recognizing said target object based on detection result and corresponding characteristic data of a known object;

storage means for storing associative information relating recognition results of said recognition means for a name of said known object;

judgment means for judging based on the name of said target object obtained by said dialog means, recognition results of said recognition means for the target object, and said associative information stored in said storage means, whether or not said target object is a new object, wherein the dialog means determines a content of the dialog with a user based on a face recognition result obtained by one of the plurality of recognition means, wherein when the recognition means recognizes a name of the user through a morphological characteristic of a face of the user, the dialog means obtains a confirmation of the recognized name from the user through dialog, wherein when the recognition means fails to recognize a name of the user through a morphological characteristic of a face of the user, the dialog means asks the user for the user's name through dialog, wherein the associative information relates the name to at least a sound identifier and a face identifier of the object, and wherein when the name of said target object obtained by the dialog means is different than a name obtained by the recognition results, the judgment means determines that target object is a new object; and control means for storing said plurality of characteristic data on said target object in corresponding said recognition means and storing associative information on the target object in said storage means when said judgment means judges that said target object is a new object.

12. The robot apparatus according to claim 11, wherein said control means controls said recognition means which recognized said target object correctly, to perform addition-learning when said judgment means judges that the target object is said known object.

13. The robot apparatus according to claim 11, wherein said control means controls said recognition means which did not recognize said target object correctly, to perform correction-learning when said judgment means judges that the target object is said known object.

14. The robot apparatus according to claim 11, wherein said judgment means judges by referring to said associative information stored in said storage means whether or not said target object is said new object, by a majority decision of the name of said target object obtained by said dialog means and the recognition results of said recognition means for the object.

15. The robot apparatus according to claim 11, wherein said control means controls the dialog means to protract said dialog according to necessity.

* * * * *